(12) United States Patent
Hagiwara et al.

(10) Patent No.: US 9,451,125 B2
(45) Date of Patent: Sep. 20, 2016

(54) IMAGE PROCESSING APPARATUS, METHOD THEREFOR, AND IMAGE READING APPARATUS

(71) Applicant: CANON KABUSHIKI KAISHA, Tokyo (JP)

(72) Inventors: Katsuyuki Hagiwara, Tokyo (JP); Takayuki Tsutsumi, Tokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/469,731

(22) Filed: Aug. 27, 2014

(65) Prior Publication Data

US 2015/0070734 A1  Mar. 12, 2015

(30) Foreign Application Priority Data

Sep. 6, 2013  (JP) ................................. 2013-185705
Jun. 6, 2014  (JP) ................................. 2014-118135

(51) Int. Cl.
| H04N 1/387 | (2006.01) |
| H04N 1/00 | (2006.01) |
| H04N 1/409 | (2006.01) |
| H04N 1/047 | (2006.01) |
| H04N 1/40 | (2006.01) |

(52) U.S. Cl.
CPC ........ *H04N 1/3878* (2013.01); *H04N 1/00774* (2013.01); *H04N 1/047* (2013.01); *H04N 1/409* (2013.01)

(58) Field of Classification Search
CPC .......... H04N 1/3878; H04N 1/00721; H04N 1/00774; H04N 1/047; H04N 1/409
USPC ........................................ 358/447, 448, 474
See application file for complete search history.

(56) References Cited

U.S. PATENT DOCUMENTS

2010/0165420 A1*  7/2010  Matsumura ........... G06T 3/4053
  358/474
2012/0127536 A1*  5/2012  Lin .................... H04N 1/00718
  358/3.26

FOREIGN PATENT DOCUMENTS

| JP | 07-221943 A | 8/1995 |
| JP | 2003-319160 A | 11/2003 |
| JP | 2012-023564 A | 2/2012 |

\* cited by examiner

*Primary Examiner* — Quang N Vo
(74) *Attorney, Agent, or Firm* — Fitzpatrick, Cella, Harper & Scinto

(57) ABSTRACT

Based on attachment position information of each of a plurality of sensor units, which reads an image in each area obtained by dividing the area of an original in a sub-scanning direction, image data output from the sensor unit undergoes attachment error correction of correcting the attachment error of the sensor unit. Image data output from the plurality of sensor units then undergo joint processing. Based on the placement information of the original, tilt correction of correcting the tilt of the original is performed for the image data having undergone the joint processing.

11 Claims, 18 Drawing Sheets

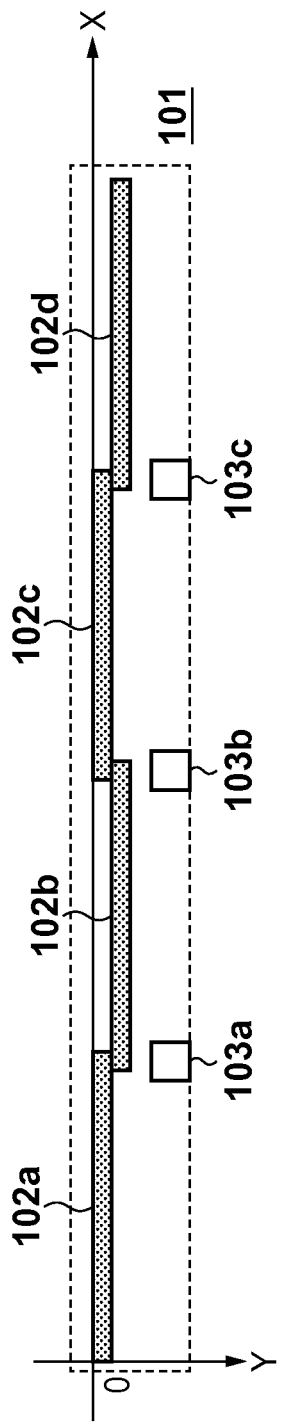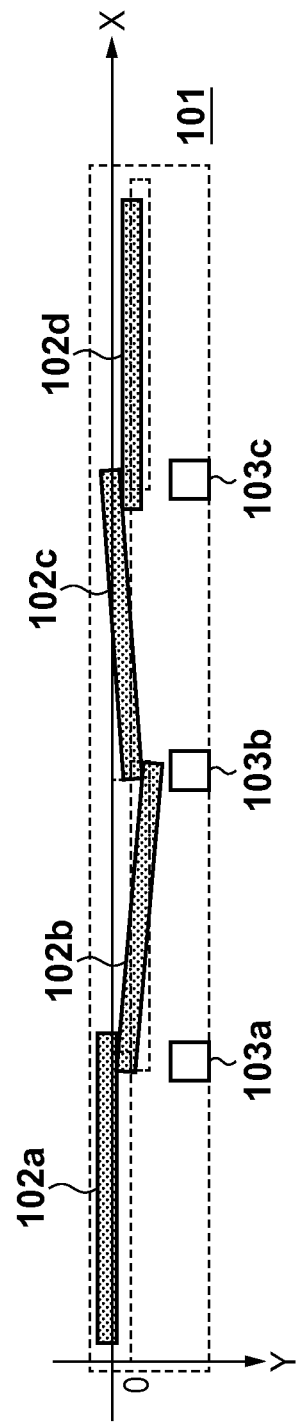

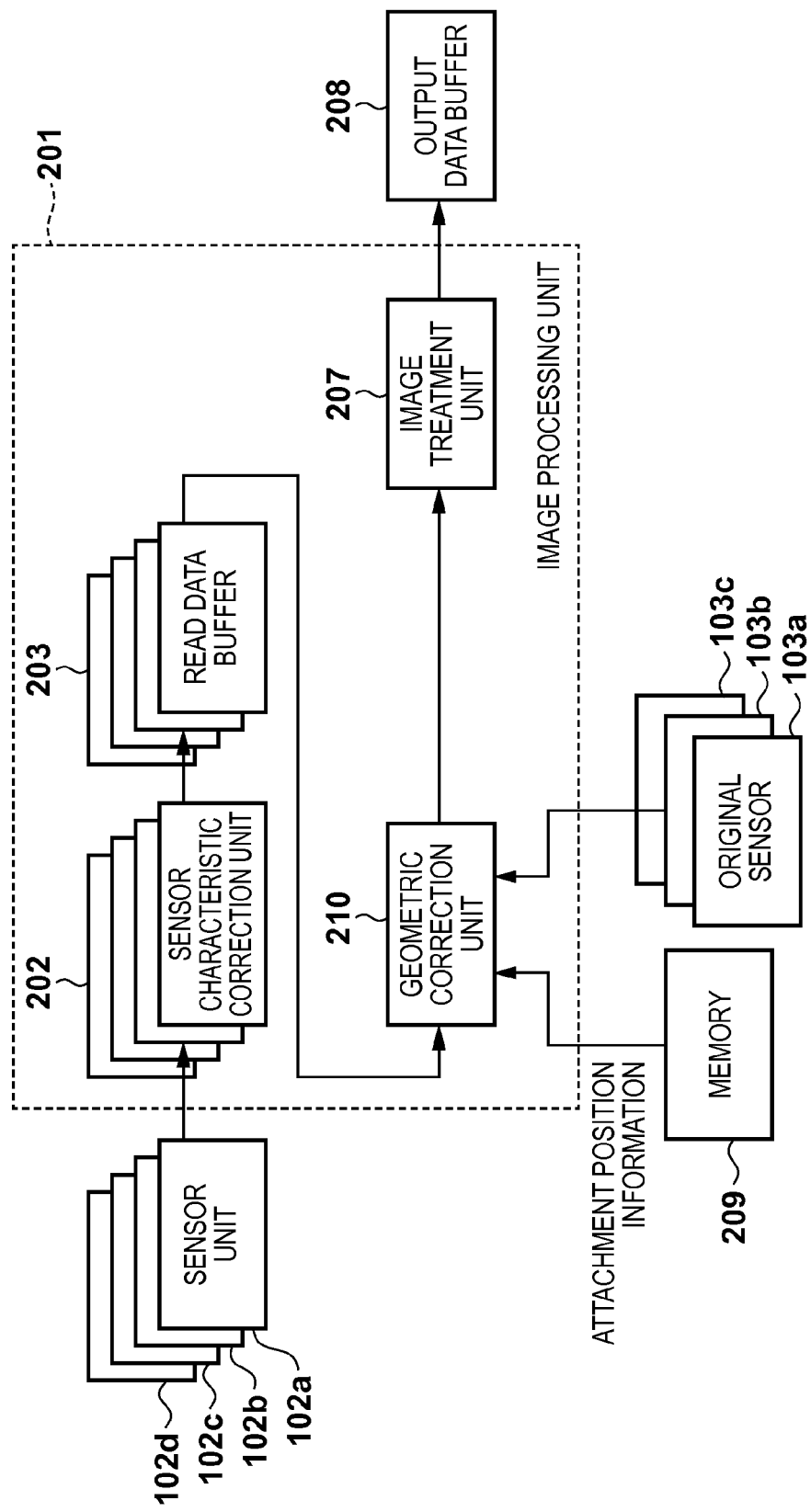

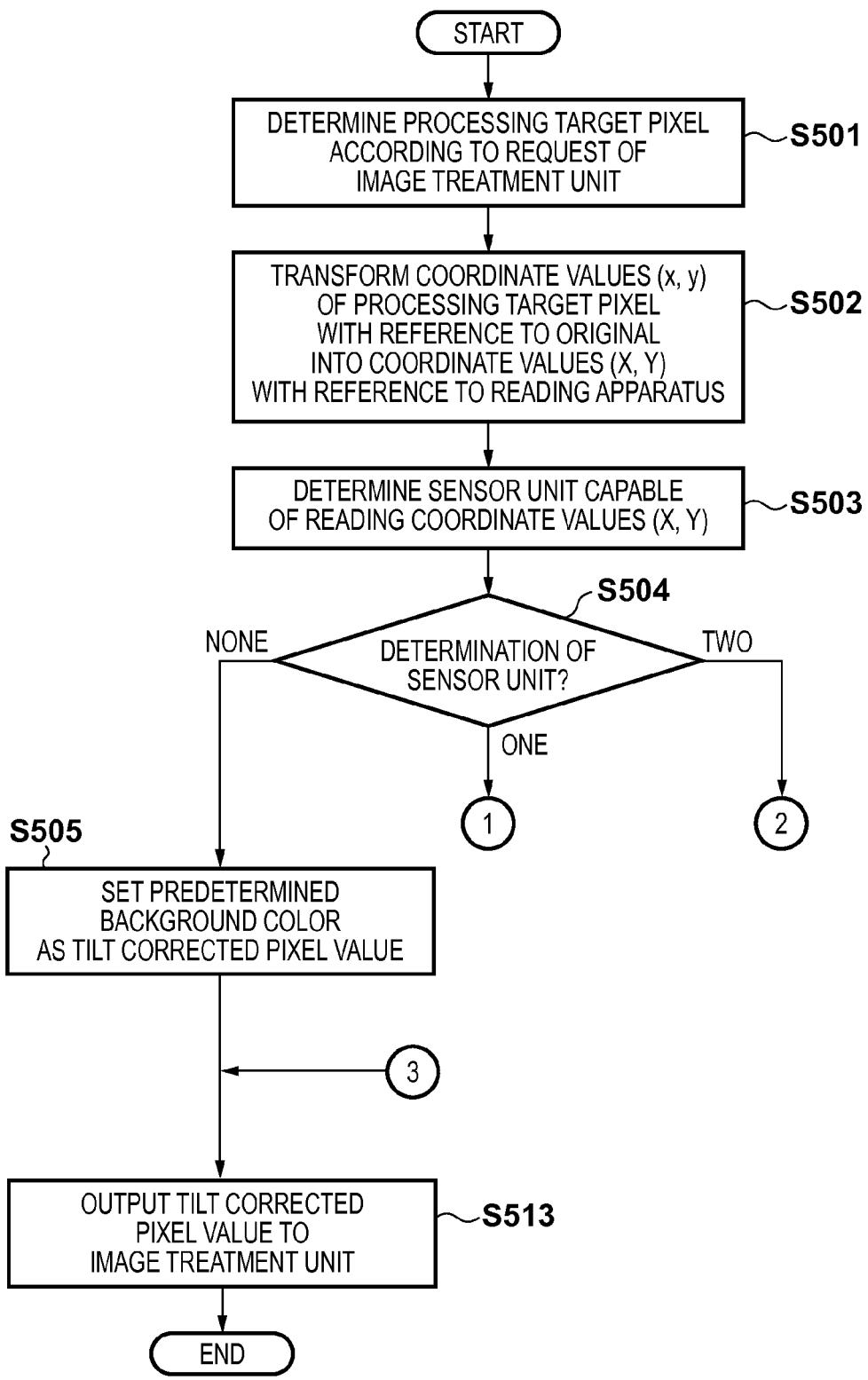

F I G. 7
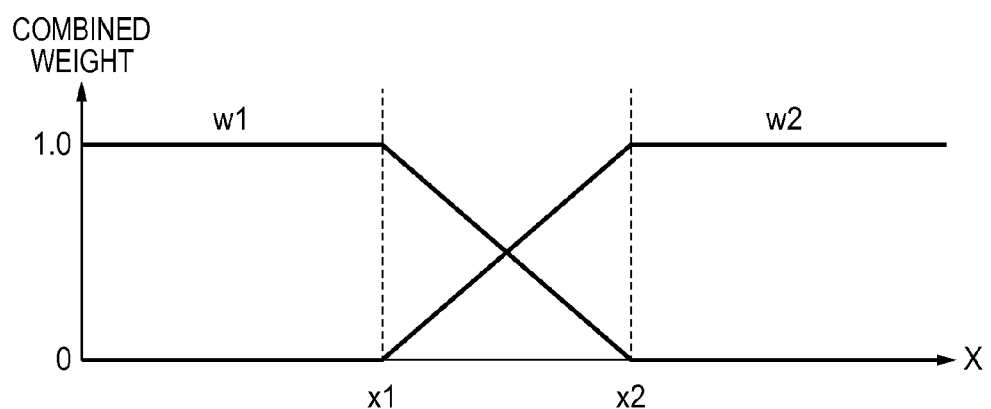

FORMAT OF PIXEL COMMAND

EXAMPLE OF PIXEL COMMAND OF PIXEL A0

F I G. 11
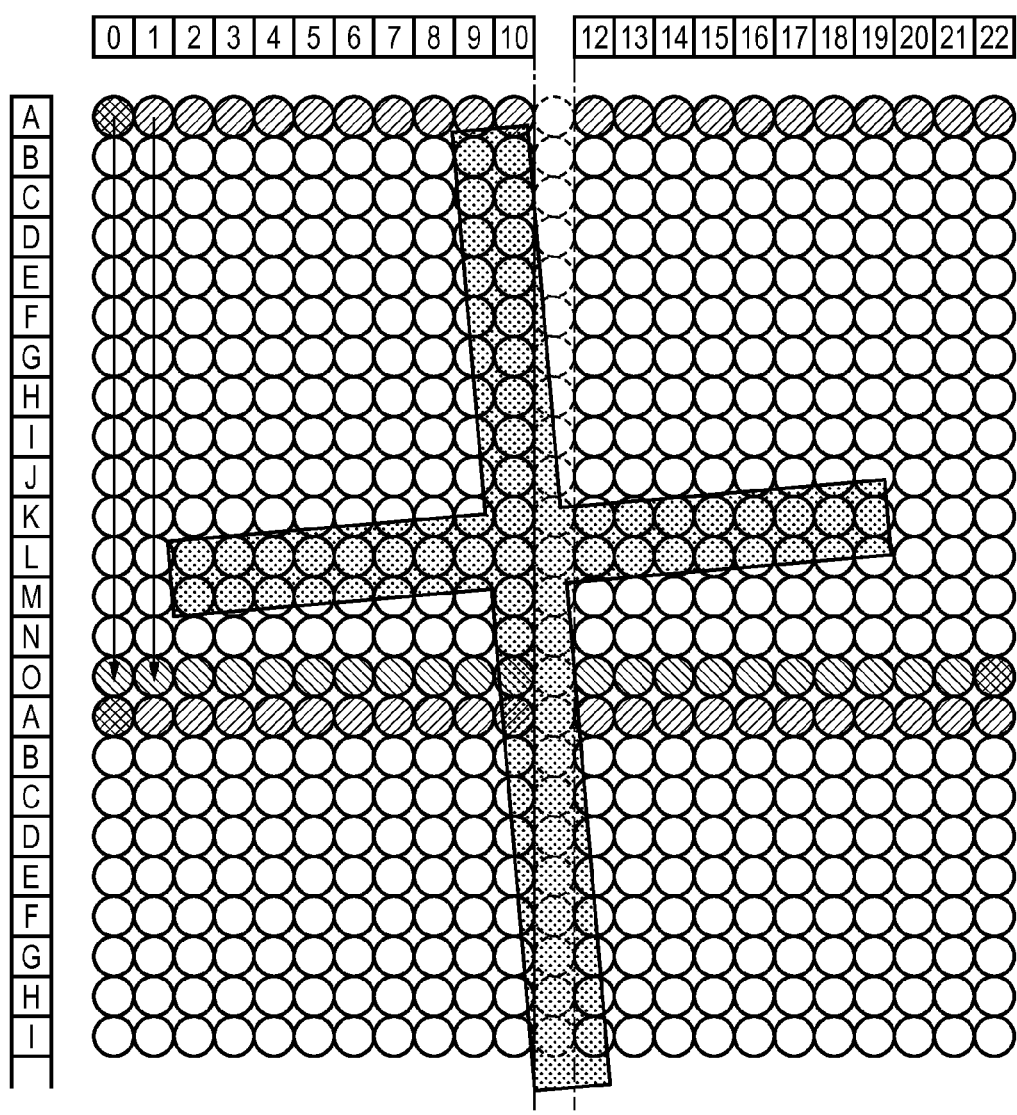

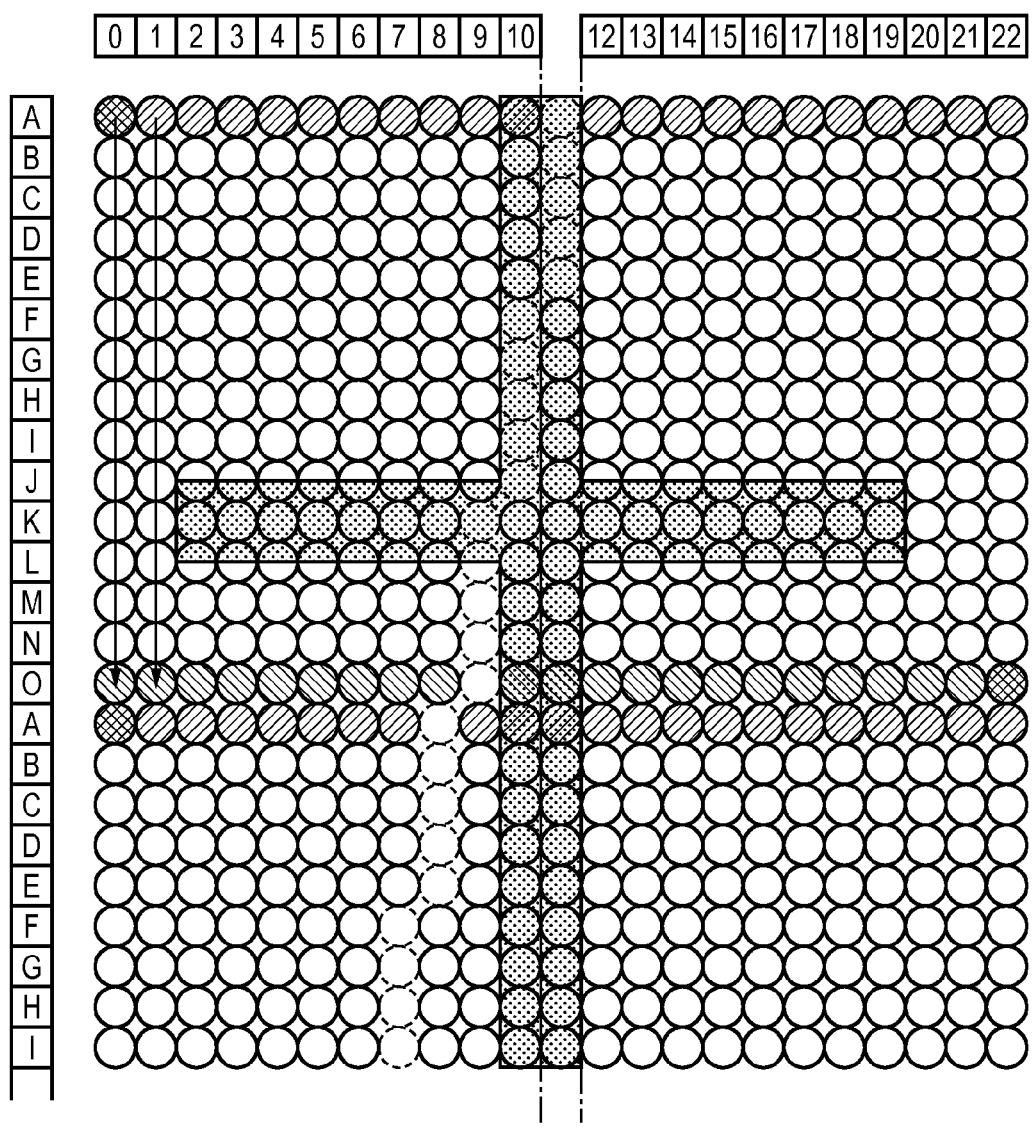
F I G. 13

EXAMPLE OF PIXEL COMMAND OF PIXEL A10

EXAMPLE OF PIXEL COMMAND OF PIXEL A11

IMAGE PROCESSING APPARATUS, METHOD THEREFOR, AND IMAGE READING APPARATUS

BACKGROUND OF THE INVENTION

1. Field of the Invention

The present invention relates to image processing when reading an original image by a reading unit to which a plurality of sensor units are attached.

2. Description of the Related Art

There has been proposed an apparatus for reading an image on an original of a large size such as an A0 or A1 size by dividing it into a plurality of areas using a reading unit to which a plurality of sensor units are attached. There has also been proposed a technique of performing correction to ensure position consistency and correction to eliminate the discontinuity of tone or color when joining image data obtained by the plurality of sensor units.

Furthermore, there has been proposed a technique of correcting a tilt when an original is placed to be tilted with respect to a scanning direction assumed by a reading apparatus. For example, this technique detects the tilt angle of the original, and performs tilt correction processing according to the detected tilt angle.

In the case of a single sensor unit, even if there is an error in attachment of the sensor unit, it is possible to correct the attachment error using read image data. In the case of a plurality of sensor units, however, when considering the tilt or offset of the original placement, it is difficult to specify, using only image data, a sensor unit which has read a specific pixel. It is, therefore, impossible to correct an attachment error different for each sensor unit. A joint position on an original image changes for each reading operation due to the tilt or offset of the original placement, thereby making it difficult to perform the joint processing of image data.

SUMMARY OF THE INVENTION

In one aspect, an image processing apparatus comprising: a storage unit configured to store attachment position information indicating attachment positions of a plurality of sensor units, each of which reads an image in each area obtained by dividing an area of an original along a sub-scanning direction; a joint correction unit configured to perform, based on the attachment position information of each sensor unit, attachment error correction of correcting an attachment error of the sensor unit for image data output from the sensor unit, and perform joint processing for the image data having undergone the attachment error correction so as to generate image data of the original; and a tilt correction unit configured to perform, based on placement information of the original, tilt correction of correcting a tilt of the original for the image data having undergone the joint processing.

According to the aspect, when a reading unit to which a plurality of sensor units are attached is used to read an original image, even if the placement of an original is tilted or offset, it is possible to obtain satisfactory image data by correcting the attachment error of each sensor unit and the tilt of the original.

Further features of the present invention will become apparent from the following description of exemplary embodiments with reference to the attached drawings.

BRIEF DESCRIPTION OF THE DRAWINGS

FIGS. 2A and 2B are views for explaining the arrangement of the sensor.

FIG. 5 is a block diagram for explaining the arrangement of an image processing unit in a reading apparatus according to the second embodiment.

FIGS. 6A and 6B are flowcharts for explaining the processing of a geometric correction unit.

FIG. 7 is a graph for explaining combining of pixel values corresponding to adjacent sensor units.

FIG. 11 is a view for explaining reading of pixel values for each band.

FIG. 13 is a view showing an example of a tilt corrected image.

DESCRIPTION OF THE EMBODIMENTS

An image processing apparatus, a method therefor, and an image reading apparatus according to each embodiment of the present invention will be described in detail below with reference to the accompanying drawings.

First Embodiment

[Sensor Units and Original]

The positional relationship between an original 104 and a sensor 101 of a reading apparatus will be explained with reference to FIG. 1. A conveyance mechanism (not shown) conveys the original 104 in a direction (original conveyance direction) indicated by an arrow in FIG. 1. The sensor 101 fixed to the reading apparatus reads an image on the conveyed original 104. Note that the present invention is applicable to an arrangement in that the sensor 101 is moved and reads the image on the original 104 placed on an original table. That is, the image on the original 104 is read by changing the relative position in a sub-scanning direction Y between the original 104 and the sensor 101.

Figure 1:
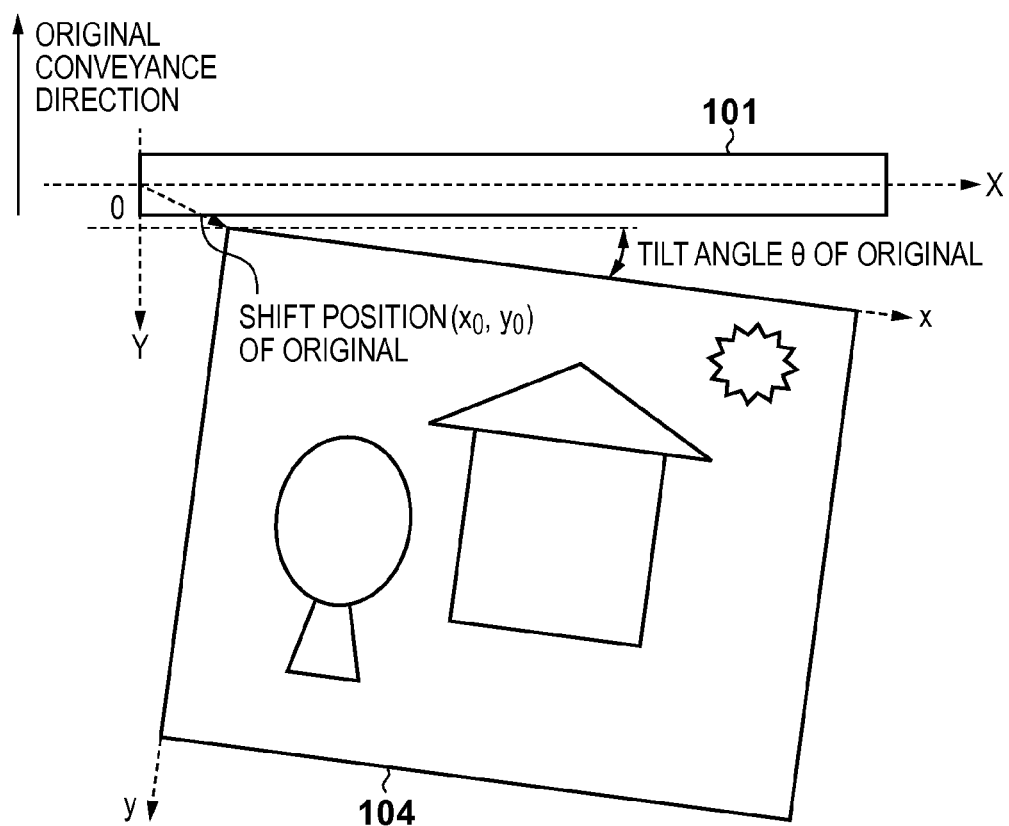
FIG. 1 is a view for explaining the positional relationship between an original and the sensor of a reading apparatus.

FIG. 1 shows a first coordinate system xy having one vertex of the original 104 as a reference (origin), and a second coordinate system XY having, for example, one end of the sensor 101 of the reading apparatus as a reference (origin).

Ideally, the original 104 is desirably placed so that one of the sides of the original 104 is along the sub-scanning direction Y. In fact, however, the original 104 may be placed at a position and angle different from ideal ones, such as a shift position ($x_0$, $y_0$) of the original and a tilt angle θ of the original. In general, therefore, the first coordinate system and the second coordinate system do not coincide with each other. If the coordinate systems do not coincide with each other, even if the tilt angle θ is small, a shift between the leading end and trailing end of the original may be large. This shift is noticeable especially for an original of a large size.

The arrangement of the sensor 101 will be described with reference to FIGS. 2A and 2B. As shown in FIG. 2A, the sensor 101 is formed by almost linearly arranging a plurality of sensor units 102a to 102d. Each of original sensors 103a to 103c is a sensor for acquiring original placement information.

The sensor units 102a to 102d are ideally arranged in a direction parallel to a main scanning direction X with reference to the second coordinate system XY to have a predetermined offset in the sub-scanning direction Y. Referring to FIG. 2B, the ideal arrangement of the sensor units 102a to 102d is indicated by broken lines. In fact, however, as indicated by solid lines, the arrangement of each sensor unit includes an error in attachment position and an error in attachment angle which are occurred in assembly of a product or replacement of parts of the product. The error in attachment position corresponds to deviation from the design attachment position, and the error in attachment angle corresponds to deviation from the design attachment angle.

Note that FIGS. 2A and 2B show only an XY plane. However, for example, there may be errors in attachment position and attachment angle in the Z-axis direction in FIGS. 2A and 2B, which are caused by, for example, a lift at the time of attachment of the sensor unit, or a bend due to the housing of the reading apparatus having no ideal rigid body.

Each of the original sensors 103a to 103c is a sensor for detecting the edge of the original 104. It is possible to obtain original placement information by calculating the tilt angle θ of the original 104 based on the time difference between timings at which the respective original sensors detect the edge of the original. Note that an error in attachment position of each of the original sensors 103a to 103c is corrected, as needed, by a method of additionally measuring the error or the like. When the original 104 is placed on the original table, it is possible to detect the position and size of the original 104 by performing a pre-scan prior to reading of the original image.

Furthermore, the sensor units 102a to 102d are arranged so as to obtain image data having no gap in the main-scanning direction X even if there exist a shift of the attachment position and that of the attachment angle to some extent. That is, the sensor units 102a to 102d are arranged so that sensor units adjacent to each other in the main scanning direction X partially overlap each other, and have different offsets in the sub-scanning direction Y.

The sensor units 102a to 102d are used to obtain four divided image data by dividing the area of the original 104 along the sub-scanning direction. It is then possible to obtain one image data corresponding to the original 104 from the four divided image data by performing joint processing by a joint correction unit 204 (to be described later) in consideration of the overlapped portions of the sensor units.

As a coordinate system for each sensor unit, the third coordinate system is set in addition to the first and second coordinate systems. In the third coordinate system, the array direction of the light-receiving elements of the sensor unit, that is, the direction of the attachment angle is set as the first axis, the sub-scanning direction Y is set as the second axis, and a position including the shift of the attachment position of the sensor unit and the offset of the placement is set as an origin.

The attachment position information of each sensor unit need only be acquired by a method of reading a predetermined adjustment pattern or directly measuring the attachment position by an additional measuring apparatus, and stored in a memory, thereby acquiring the attachment position information of each sensor unit from the memory, as needed.

Alternatively, it is possible to specify a relative position with respect to the reference sensor unit for each reading operation by correlating portions readable by the plurality of sensor units in the image data read from the original 104. Even if there is an error in attachment angle, it is possible to correct distortion later by correcting the image data using the joint correction unit 204 (to be described later) according to the reference sensor unit, and joining the image data, similarly to a case in which a single sensor unit is used to read the image data.

[Image Processing Unit]

Figure 3:
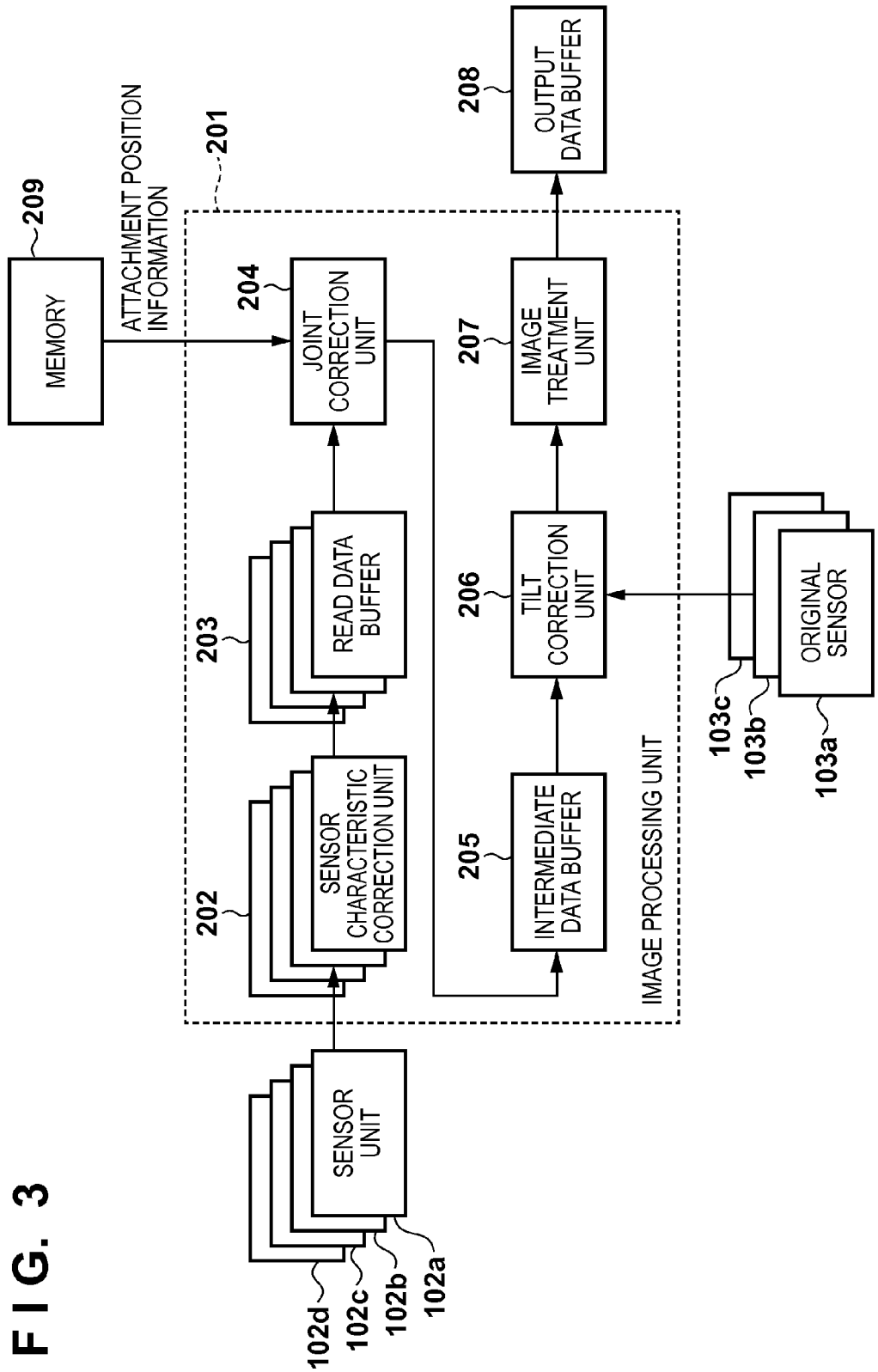
FIG. 3 is a block diagram for explaining the arrangement of an image processing unit in the reading apparatus according to the first embodiment.

The arrangement of an image processing unit 201 in the reading apparatus according to the first embodiment will be described with reference to FIG. 3. The image processing unit 201 generates image data of the first coordinate system xy with reference to the original by obtaining a pixel value at each pixel position on the first coordinate system xy with reference to the original. The image processing unit 201 then executes image processing for the generated image data.

Sensor characteristic correction units 202 respectively perform correction of characteristics different for each sensor unit and each light-receiving element of each sensor unit, such as shading correction, for image data output from the sensor units 102a to 102d, thereby normalizing the image data. By assuming a case in which correction coefficients and the like are different due to the characteristics of the respective sensor units, each sensor characteristic correction unit 202 is provided for each sensor unit.

The sensor characteristic correction units 202 are arranged before the joint correction unit 204 (to be described later). This is because if the sensor characteristic correction units 202 are arranged after the joint correction unit 204, the correspondence between each pixel value having undergone attachment error correction and a sensor unit which has read the pixel value becomes uncertain.

Read data buffers 203 temporarily store the image data output from the sensor characteristic correction units 202, respectively. Each read data buffer 203 is provided for each sensor unit, similarly to the sensor characteristic correction units 202. Furthermore, the order of pixel values output from the respective sensor units may be different from that of pixel values read out by the joint correction unit 204, and thus the read data buffers 203 are configured to be randomly accessed.

The joint correction unit 204 acquires the pieces of attachment position information (attachment position and attachment angle including errors) of the sensor units from a nonvolatile memory 209. The joint correction unit 204 outputs pixel values (to be referred to as "attachment-error corrected pixel values hereinafter) obtained by performing attachment error correction for the image data output from the plurality of sensor units 102a to 102d according to the pieces of attachment position information. That is, the joint correction unit 204 performs coordinate transformation of the image data from the third coordinate system with reference to each sensor unit into the second coordinate system with reference to the reading apparatus. The joint correction unit 204 preferentially selects one of the sensor units for an area which is readable overlappingly by a plurality of sensor units, thereby performing the joint processing of the image data.

An intermediate data buffer 205 temporarily stores, for tilt correction, the image data which has been joined by the joint correction unit 204 and is formed from attachment-error corrected pixel values. Since the order of the attachment-error corrected pixel values obtained by the joint correction unit 204 is different from the order in which a tilt correction unit 206 reads out the attachment-error corrected pixel values, the intermediate data buffer 205 is configured to be randomly accessed.

The tilt correction unit 206 calculates original placement information from signals of the original sensors 103a to 103c, and corrects the image data read out from the intermediate data buffer 205 in accordance with the original placement information, thereby correcting the tilt of the original image. That is, the tilt correction unit 206 performs coordinate transformation of the image data from the second coordinate system with reference to the reading apparatus into the first coordinate system with reference to the original.

As described above, the tilt correction unit 206 can obtain image data corresponding to the respective pixel positions on the first coordinate system. Although the operation of the tilt correction unit 206 will be described in detail later, the tilt correction unit 206 is configured to operate in the same order as the processing order of an image treatment unit 207 to reduce a buffer between the tilt correction unit 206 and the image treatment unit 207.

The image treatment unit 207 performs, for the image data obtained by the tilt correction unit 206, one or both of image processing such as density correction, contrast correction, or noise removal, and data compression processing. Note that if neither image processing nor data compression processing is necessary, the image treatment unit 207 can be omitted.

Especially when the image processing of the image treatment unit 207 includes spatial filter processing such as edge enhancement, it is desirable to process the image data in the order of rectangular blocks having a predetermined width and height so as to perform processing with a small internal memory capacity. Furthermore, when image data compression including orthogonal transformation for each block of a predetermined size like JPEG (Joint Photographic Experts Group) is applied, processing for each block is preferable.

An output data buffer 208 temporarily stores the image data having undergone the image processing by the image treatment unit 207, or the tilt corrected image data obtained by the tilt correction unit 206 when the image treatment unit 207 is omitted.

Note that the sensor characteristic correction unit 202, joint correction unit 204, tilt correction unit 206, and image treatment unit 207 can also be implemented by supplying programs for implementing the functions of the units to a single or a plurality of microprocessors (CPUs) of a computer device through a recording medium. The read data buffer 203, intermediate data buffer 205, and output data buffer 208 may be allocated to a random access memory (RAM) serving as a work memory for the CPU.

[Coordinate Transformation]

The third coordinate system different for each sensor unit will be described with reference to FIG. 4. For example, the sensor units 102a and 102b can read divided areas 301a and 301b within a predetermined time, respectively. That is, the third coordinate system of the sensor unit 102a is a coordinate system XaYa, and that of the sensor unit 102b is a coordinate system XbYb.

The third coordinate system is a coordinate system with reference to the corresponding sensor unit, and serves as the reference coordinate system of the image data read by the sensor unit. In consideration of an error in attachment angle of the sensor unit, for example, the coordinate system XbYb is not a rectangular coordinate system. This is because an Xb-axis includes an error in attachment angle of the sensor unit 102b but a Yb-axis coincides with the sub-scanning direction determined based on the original conveyance direction and is thus not influenced by the error in attachment angle.

The transformation formulas for transformation among the first coordinate system, the second coordinate system, and third coordinate system are given by:

$$\begin{bmatrix} Xn \\ Yn \\ 1 \end{bmatrix} = \begin{bmatrix} \cos\theta_n & -\sin\theta_n & -x_n \\ 0 & 1 & -y_n \\ 0 & 0 & 1 \end{bmatrix} \begin{bmatrix} X \\ Y \\ 1 \end{bmatrix} \quad (1)$$

$$\begin{bmatrix} X \\ Y \\ 1 \end{bmatrix} = \begin{bmatrix} \cos\theta & -\sin\theta & x_0 \\ \sin\theta & \cos\theta & y_0 \\ 0 & 0 & 1 \end{bmatrix} \begin{bmatrix} x \\ y \\ 1 \end{bmatrix} \quad (2)$$

In this embodiment, the above two coordinate transformation formulas are used. The first coordinate transformation formula indicated by equation (1) is used to transform coordinate values (X, Y) on the second coordinate system with reference to the reading apparatus into coordinate values (Xn, Yn) on the third coordinate system with reference to the sensor unit. The parameters of the first coordinate transformation formula are an attachment angle $\theta_n$ formed by the attachment direction of the a sensor unit 102n with the X-axis of the second coordinate system, and an attachment position $(x_n, y_n)$ on the second coordinate system of the sensor unit 102n.

Note that since the attachment angle and attachment position are different for each sensor unit, the parameters $\theta_n$ and $(x_n, y_n)$ of the first coordinate transformation formula are also different for each sensor unit. Furthermore, the second coordinate transformation formula indicated by equation (2) is used to transform the coordinate values (x, y) on the first coordinate system with reference to the original into coordinate values (X, Y) on the second coordinate system with reference to the reading apparatus. The parameters of the second coordinate transformation formula are the original shift position $(x_0, y_0)$ and the original tilt angle $\theta$.

[Joint Correction Unit]

The joint correction unit 204 acquires an attachment-error corrected pixel value in a predetermined pixel order for each pixel corresponding to the coordinate values (X, Y) on the second coordinate system with reference to the reading apparatus. For example, a pixel order which makes write addresses in the intermediate data buffer 205 continuous is efficient.

In other words, the joint correction unit 204 performs correction of the image data output from each of the plurality of sensor units 102a to 102d in accordance with the attachment position information of the sensor unit. That is, the joint correction unit 204 obtains image data of the second coordinate system with reference to the reading apparatus from the image data of the third coordinate system with reference to the sensor unit, and joins the obtained image data with image data of an adjacent sensor unit, as needed.

The joint correction unit 204 transforms the coordinate values (X, Y) on the second coordinate system of a processing target pixel into the coordinate values (Xn, Yn) on the third coordinate system according to the first coordinate transformation formula indicated by equation (1). The coordinate values (Xn, Yn) correspond to coordinate values on the third coordinate system with reference to each sensor unit, such as (Xa, Ya) or (Xb, Yb) shown in FIG. 4.

Figure 4:
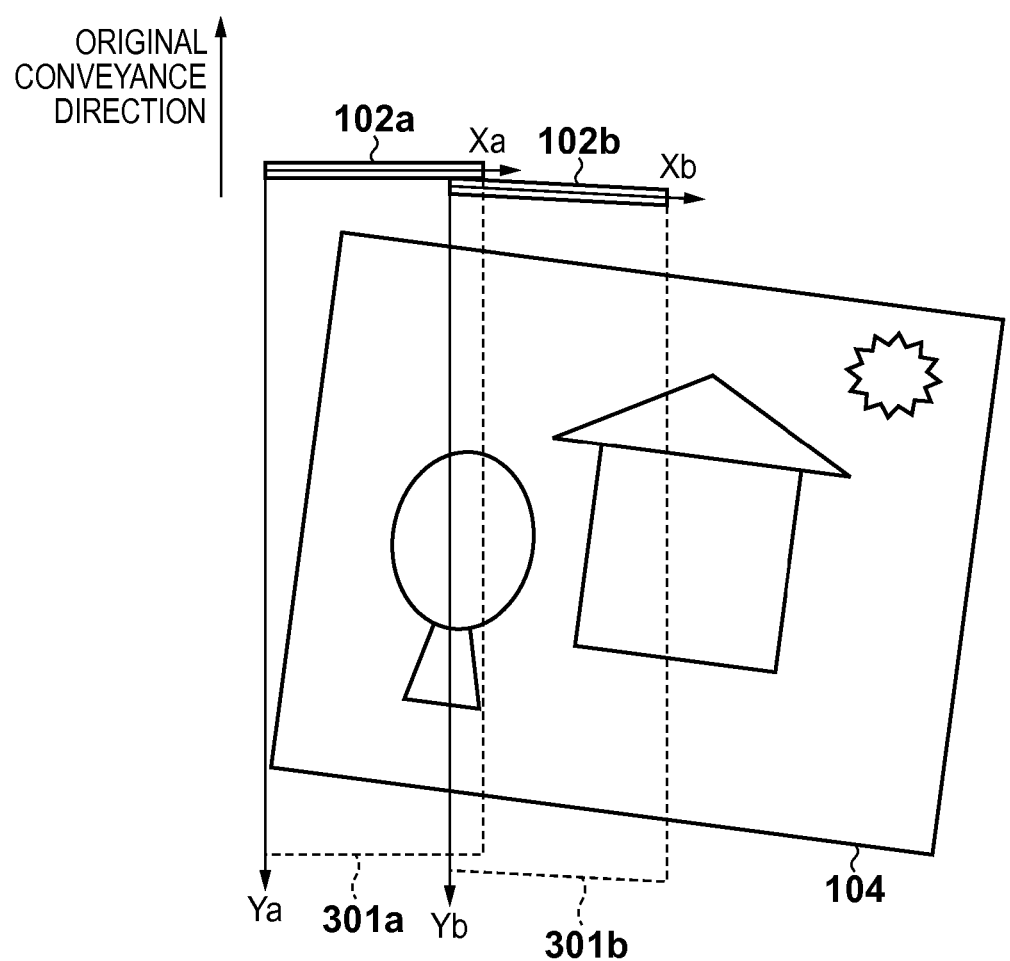
FIG. 4 is a view for explaining the third coordinate system different for each sensor unit.

The joint correction unit 204 determines whether the coordinate values (Xn, Yn) fall within the readable range of each sensor unit (for example, the divided area 301a or 301b shown in FIG. 4). For example, by comparing Xn with the effective width of the sensor unit 102a and Yn with an original feed amount, the joint correction unit 204 can determine whether the sensor unit 102a can read the pixel of the coordinate values (Xn, Yn).

The above-described coordinate transformation and determination are sequentially performed for the respective processing target pixels in a predetermined order for each sensor unit. For example, a sensor unit that has been first determined to have a readable range within which the coordinate values fall is preferentially selected.

That is, the joint correction unit 204 selects a sensor unit having a readable range within which the coordinate values (Xn, Yn) fall. The joint correction unit 204 then reads out, as the attachment-error corrected pixel value of the coordinate values (X, Y) on the second coordinate system, a pixel value at an address corresponding to the coordinate values (Xn, Yn) in the read data buffer 203 corresponding to the sensor unit. Alternatively, if there is no sensor unit having a readable range within which the coordinate values (Xn, Yn) fall, the joint correction unit 204 assigns a pixel value corresponding to a predetermined background color as the attachment-error corrected pixel value of the coordinate values (X, Y).

The attachment-error corrected pixel value thus obtained is stored at an address corresponding to the coordinate values (X, Y) in the intermediate data buffer 205. That is, the joint correction unit 204 stores the attachment-error corrected pixel value in the intermediate data buffer 205 in association with the coordinate values (X, Y).

Note that the read data buffer 203 stores a pixel value acquired at a predetermined sampling interval while the coordinate values (Xn, Yn) obtained by the first coordinate transformation are not necessarily integer values. A simple method of obtaining the attachment-error corrected pixel value is a nearest neighbor algorithm, and a pixel value at a sample point corresponding to integer coordinate values obtained by rounding the coordinate values (Xn, Yn) to the nearest integers may be set as the attachment-error corrected pixel value. That is, the joint correction unit 204 reads out, as the attachment-error corrected pixel value, a pixel value at an address corresponding to coordinate values obtained by rounding the coordinate values (Xn, Yn) to integer values in the read data buffer 203 corresponding to the selected sensor unit.

Alternatively, the attachment-error corrected pixel value may be acquired by interpolation processing. The interpolation processing is to calculate the attachment-error corrected pixel value by referring to a plurality of neighboring sample points, and performing weighting calculation according to the difference between the coordinate values (Xn, Yn) and the coordinate values of each sample point. Bilinear interpolation and bicubic interpolation are widely used.

Furthermore, by projecting in advance the readable range of each sensor unit onto the main scanning axis X of the second coordinate system, it is possible to readily select a sensor unit. That is, the joint correction unit 204 need only determine whether the coordinate values (X, Y) of a processing target pixel fall within the projected range.

[Tilt Correction Unit]

The tilt correction unit 206 acquires a pixel value (to be referred to as a "tilt corrected pixel value" hereinafter) having undergone tilt correction for each pixel corresponding to the coordinate values (x, y) on the first coordinate system with reference to the original. At this time, to make a pixel processing order comply with a request of the image treatment unit 207, the tilt correction unit 206 operates based on a processing request added with the pixel position information of the first coordinate system xy, which has been received from the image treatment unit 207. Alternatively, the tilt correction unit 206 and image treatment unit 207 may be configured to respectively operate according to a predetermined processing order commonly set between them.

The tilt correction unit 206 transforms the coordinate values (x, y) on the first coordinate system of the processing target pixel into the coordinate values (X, Y) on the second coordinate system with reference to the reading apparatus by the second coordinate transformation formula indicated by equation (2). The tilt correction unit 206 then reads out the attachment-error corrected pixel value at the address corresponding to the coordinate values (X, Y) in the intermediate data buffer 205 as the tilt corrected pixel value of the coordinate values (x, y) on the first coordinate system, and supplies the tilt corrected pixel value to the image treatment unit 207.

With the above processing, it is possible to obtain image data formed from tilt corrected pixel values obtained by correcting the attachment position of each sensor unit, joining image data obtained by the respective sensor units, and correcting the tilt of the original. Note that rounding or interpolation processing of the coordinate values (X, Y) is the same as the processing described in connection with the joint correction unit 204.

When reading out the attachment-error corrected pixel value from the intermediate data buffer 205, the tilt correction unit 206 may perform the same interpolation processing as that of the joint correction unit 204, as needed. When acquiring a pixel value for one pixel by interpolation processing, the read data buffer 203 or intermediate data buffer 205 is desirably configured to have a cache function, as needed, by considering that a plurality of pixels are referred to or the same pixel is referred to a plurality of times.

As described above, the joint correction unit 204 joins the image data, which includes correction according to the attachment position information. The tilt correction unit 206 performs tilt correction of the image data according to the original placement information. By using the randomly accessible intermediate data buffer 205, the tilt correction unit 206 can acquire a tilt corrected pixel value in an arbitrary pixel order, independently of the joint correction unit 204. Note that image enlargement/reduction processing can be implemented by setting a coefficient corresponding to an enlargement ratio or reduction ratio in the second coordinate transformation by the tilt correction unit 206.

When the sensor unit has an attachment angle error in the Z-axis direction, a projection on the XY plane of the effective length of the sensor is shorter than that in a case in which the sensor unit has no attachment angle error. That is, the sensor unit reads a section shorter than that in an ideal case, and outputs enlarged image data, as compared with a case in which the sensor unit has no attachment angle error. Therefore, it is only necessary to perform correction to reduce the image data in the attachment direction of the sensor unit in the first coordinate transformation by the joint correction unit 204.

As described above, in the image reading apparatus for reading an image on an original of a large size by the plurality of sensor units, even if the placement of an original is tilted or offset, it is possible to obtain satisfactory image data by correcting the attachment error of each sensor unit and the tilt of the original.

Second Embodiment

An image processing apparatus, a method therefor, and an image reading apparatus according to the second embodiment of the present invention will be described below. Note that in the second embodiment, the same reference numerals as those in the first embodiment denote the same components and a detailed description thereof will be omitted.

The arrangement of an image processing unit 201 in the reading apparatus according to the second embodiment will be explained with reference to FIG. 5. To eliminate the need for the intermediate data buffer 205, the image processing unit 201 of the second embodiment includes a geometric correction unit 210 for implementing both the functions of a joint correction unit 204 and a tilt correction unit 206.

The geometric correction unit 210 uses the above-described second coordinate transformation and the third coordinate transformation obtained by combining the above-described first and second coordinate transformations. The third coordinate transformation formula obtained by combining equations (1) and (2) is given by:

$$\begin{bmatrix} Xn \\ Yn \\ 1 \end{bmatrix} = \begin{bmatrix} \cos\theta_n & -\sin\theta_n & -x_n \\ 0 & 1 & -y_n \\ 0 & 0 & 1 \end{bmatrix} \begin{bmatrix} \cos\theta & -\sin\theta & x_0 \\ \sin\theta & \cos\theta & y_0 \\ 0 & 0 & 1 \end{bmatrix} \begin{bmatrix} x \\ y \\ 1 \end{bmatrix} \quad (3)$$

That is, it is possible to transform coordinate values (x, y) on the first coordinate system with reference to an original into coordinate values (Xn, Yn) on the third coordinate system with reference to a sensor unit using the third coordinate transformation formula different for each sensor unit.

Figure 6B:
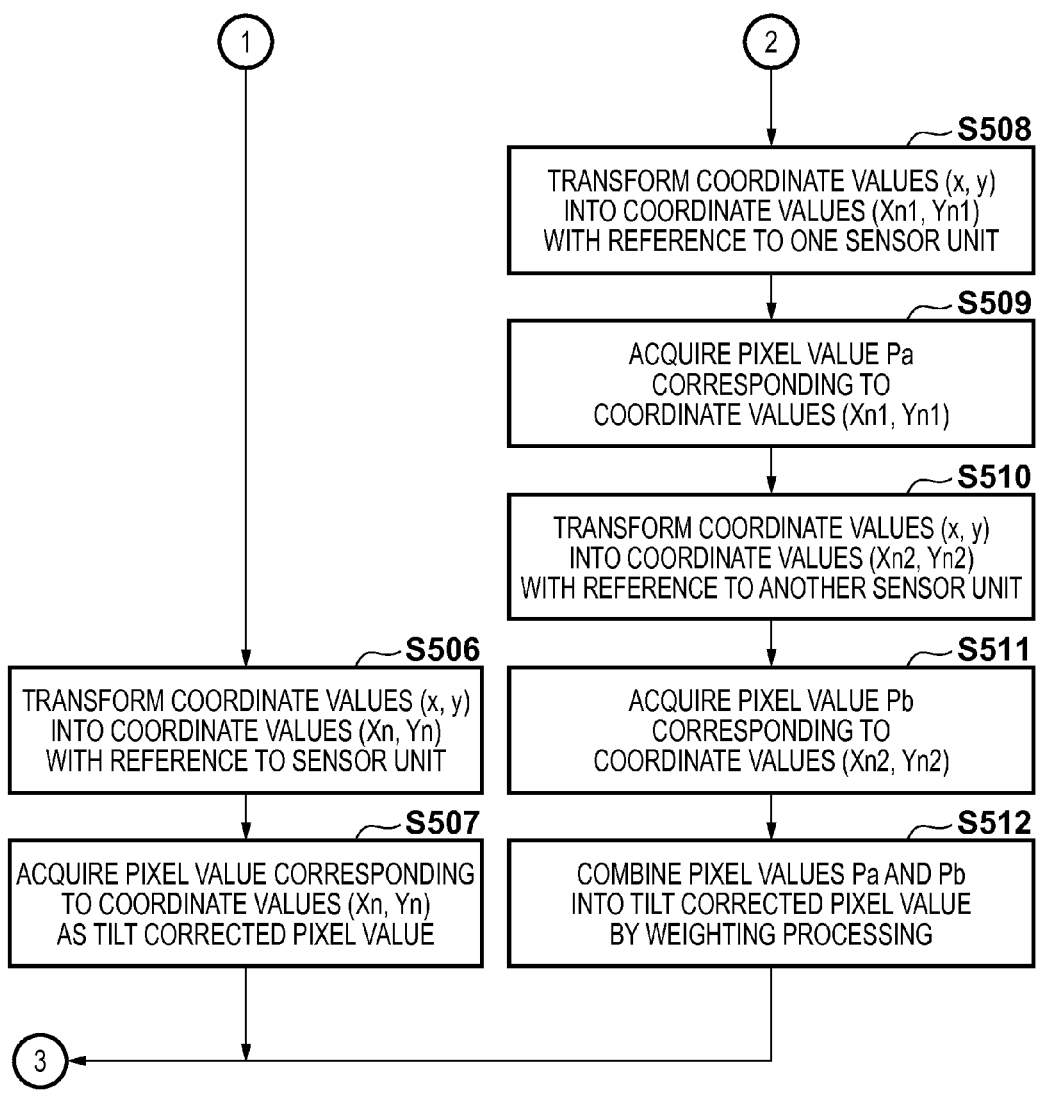

The processing of the geometric correction unit 210 will be described with reference to flowcharts shown in FIGS. 6A and 6B. Note that FIGS. 6A and 6B show processing for one pixel. The geometric correction unit 210 determines the coordinate values (x, y) on the first coordinate system of a processing target pixel according to a request of an image treatment unit 207 (S501). In other words, a pixel to be required next by the image treatment unit 207 is set as a processing target pixel. Alternatively, a processing target pixel may be determined according to a predetermined processing order commonly set between the geometric correction unit 210 and the image treatment unit 207.

The geometric correction unit 210 transforms the coordinate values (x, y) on the first coordinate system with reference to the original into coordinate values (X,Y) on the second coordinate system with reference to the reading apparatus using the second coordinate transformation formula (S502). At this time, as shown in FIG. 1, if an X-axis is set to be perpendicular to an original conveyance direction, it is only necessary to consider the axis when selecting a sensor unit in step S503 (to be described later), and thus calculation of another Y-axis can be omitted.

Based on the coordinate values (X, Y) on the second coordinate system, the geometric correction unit 210 determines a sensor unit capable of reading the processing target pixel (S503). By considering the X-axis perpendicular to the original conveyance direction, it is possible to obtain in advance the range of the coordinate value X, within which each sensor unit should be responsible for reading of the coordinate value. That is, it is possible to determine sensor units to be selected and the number of sensor units by determining a sensor unit having the range of the coordinate value X, in which the coordinate value X obtained in step S502 falls.

For an area where sensor units are arranged to overlap each other, one of the sensor units may be preferentially selected, or pixel values corresponding to the respective sensor units may be combined. Combining of pixel values corresponding to adjacent sensor units will be explained with reference to FIG. 7. That is, an attachment-error corrected pixel value is calculated by setting weight coefficients, as follows:

$$\text{if}(X \le x1)\{w1 = 1; w2 = 0;\} \quad (4)$$
$$\text{if}(x1 < X < x2)$$
$$\{w1 = (x2 - X)/(x2 - x1); w2 = (X - x1)/(x2 - x1);\}$$
$$\text{if}(x2 \le X)\{w1 = 0; w2 = 1;\}$$
$$P1 = w1 \cdot Pa + w2 \cdot Pb;$$

where x1 and x2 respectively represent thresholds of coordinate values (see FIG. 7), w1 represents a weight of a pixel value Pa corresponding to a sensor unit a, w2 represents a weight of a pixel value Pb corresponding to a sensor unit b, and P1 represents the attachment-error corrected pixel value.

Furthermore, to smooth switching between the sensor units, it is also possible to vary the thresholds x1 and x2 within a predetermined range without fixing them. When a combined weight changes due to the difference between the thresholds x1 and x2, it is preferable to obtain a combined weight in synchronism with determination of the sensor unit in step S503.

The geometric correction unit 210 branches the process according to determination of the sensor unit (S504). If the coordinate value X falls outside the readable ranges of all the sensor units, and there is no sensor unit capable of reading the coordinate value X, the geometric correction unit 210 sets a predetermined background color as a tilt corrected pixel value (S505).

If the number of selected sensor units is one, the geometric correction unit 210 transforms the coordinate values (x, y) on the first coordinate system with reference to the original into coordinate values (Xn, Yn) on the third coordinate system with reference to the sensor unit using the third coordinate transformation formula indicated by equation (3) (S506). If, for example, a sensor unit 102a is selected in step S503, coordinate values (Xa, Ya) are obtained by the third coordinate transformation formula having an attachment position (xa, ya) and attachment angle θa of the sensor unit as parameters. The geometric correction unit 210 acquires a pixel value corresponding to the coordinate values (Xn, Yn) as a tilt corrected pixel value (S507).

At this time, interpolation processing may be performed, as needed, similarly to the joint correction unit 204 in the first embodiment.

If the number of selected sensor units is two, the geometric correction unit 210 transforms the coordinate values (x, y) into coordinate values (Xn1, Yn1) with reference to one of the sensor units using the third coordinate transformation formula indicated by equation (3) (S508). The geometric correction unit 210 acquires a pixel value Pa corresponding to the coordinate values (Xn1, Yn1) (S509). Subsequently, the geometric correction unit 210 transforms the coordinate values (x, y) into coordinate values (Xn2, Yn2) with reference to another sensor unit using the third coordinate transformation formula indicated by equation (3) (S510). The geometric correction unit 210 acquires a pixel value Pb corresponding to the coordinate values (Xn2, Yn2) (S511). Furthermore, the geometric correction unit 210 performs weighting processing of combining the pixel values Pa and Pb into a tilt corrected pixel value by the same processing as that indicated by expression (4) (S512). After that, the geometric correction unit 210 outputs the tilt corrected pixel value to the image treatment unit 207 (S513).

Note that a case in which a weighted average is calculated has been explained with reference to FIG. 7 and expression (4). However, using the weighted average may degrade an edge. To prevent degradation of the edge, the weight may be changed to form an S-shaped curve instead of linearly changing the weight, or one of the pixel values may be selected at a probability corresponding to the weight instead of calculating the average.

Although the pixel values Pa and Pb are acquired in two steps S509 and S511 in the above example, a combined tilt corrected pixel value can be directly obtained by three-dimensional interpolation processing by adding the axis of the combined weight to two-dimensional coordinate values.

As described above, the geometric correction unit 210 is formed by the second coordinate transformation without including reading of a pixel value for specifying a sensor unit capable of reading each pixel position of corrected image data, and the third coordinate transformation of obtaining a pixel value (tilt corrected pixel value) including tilt correction. It is, therefore, possible to efficiently obtain satisfactory image data which can be processed in an arbitrary pixel order and for which the attachment error of each sensor unit and the tilt of the original have been corrected.

Especially when obtaining a tilt corrected pixel value by interpolation processing, it is possible to correct the attachment error and tilt by performing interpolation processing only once, thereby halving the number of operations of reading a sample point to be referred to and a data transfer amount, as compared with a case in which correction of the attachment error and correction of the tilt are performed as different interpolation processes.

The image reading apparatus in which the plurality of sensor units are arranged and which can read an original of a larger size according to the second embodiment can efficiently execute geometric correction processing including correction of the attachment error of each sensor unit and correction of the tilt of the original.

Third Embodiment

An image processing apparatus, a method therefor, and an image reading apparatus according to the third embodiment of the present invention will be described below. Note that in the third embodiment, the same reference numerals as those in the first and second embodiments denote the same components and a detailed description thereof will be omitted.

[Missing Pixel]

In the first and second embodiments, a case has been explained in which even if there exist shifts of the attachment positions and attachment angles of the plurality of sensor units to some extent, the plurality of sensor units are arranged so as to obtain image data having no gap in the main scanning direction X. That is, as shown in FIG. 2B, the sensor units 102a to 102d are arranged so that sensor units adjacent to each other in the main scanning direction X partially overlap each other, and have different offsets in the sub-scanning direction Y.

In consideration of the easiness of an operation of attaching the sensor units and decreasing the shifts of the attachment positions and attachment angles, however, the plurality of sensor units are arrayed in a line in the main scanning direction X not to positively change the offsets in the sub-scanning direction Y. With such attachment, if divided image data undergo joint processing, due to a gap between the sensor units in the main-scanning direction X, image data in which image data corresponding to the gap are missing is obtained. Note that pixels corresponding to the missing portion of the image data will be referred to as "missing pixels" hereinafter.

As a technique of improving missing of the image data, there has been proposed a method of detecting the position of a missing pixel, and setting, as the value of the missing pixel, the average of the values of pixels (to be referred to as "right and left pixels" hereinafter) to the right and left of the missing pixel. According to this method, when the original is tilted, it is necessary to perform interpolation processing of the missing pixel by the values of pixels in the obliquely right and left directions according to a tilt angle θ.

If, for example, there is a missing pixel on a ruled line described on computer-aided design (CAD) drawing, interpolation processing is performed using the values of the left and right pixels in the oblique direction, and the thicknesses of ruled lines may become unequal depending on the tilt angle θ. Especially when a ruled line extending in the sub-scanning direction Y is positioned near the gap between the sensor units, jaggies on a corrected vertical line are noticeable. Furthermore, if tilt correction is performed before correction of the missing pixel to prevent the influence of the tilt of the original on correction of the missing pixel, the pixel position changes, thereby making it difficult to specify the missing pixel.

As described above, the sensor characteristic correction unit 202 performs shading correction of the image data output from the sensor units 102a to 102d. At this time, to increase the processing speed, correction values to be used for shading correction are stored in the memory in advance. The memory need only have a memory capacity capable of storing correction values for the light-receiving elements of the sensor units 102a to 102d to correct the difference between the characteristics of the respective light-receiving elements of the sensor units 102a to 102d, or the shift of the characteristics in the main scanning direction X. If, however, the number of pixels in the main scanning direction X is increased by increasing the number of sensor units to be implemented, the memory capacity of the memory also increases.

In the third embodiment, image processing of reducing the memory capacity of a memory for shading correction and improving the image quality by tilt correction in the image reading apparatus in which a plurality of sensor units are arrayed in a line in the main scanning direction X will be described. The image processing according to the third embodiment effectively works especially when a line extending in the sub-scanning direction is positioned near the gap between the sensor units, and read by the plurality of sensor units due to the tilt of an original.

[Image Processing Unit]

Figure 8:
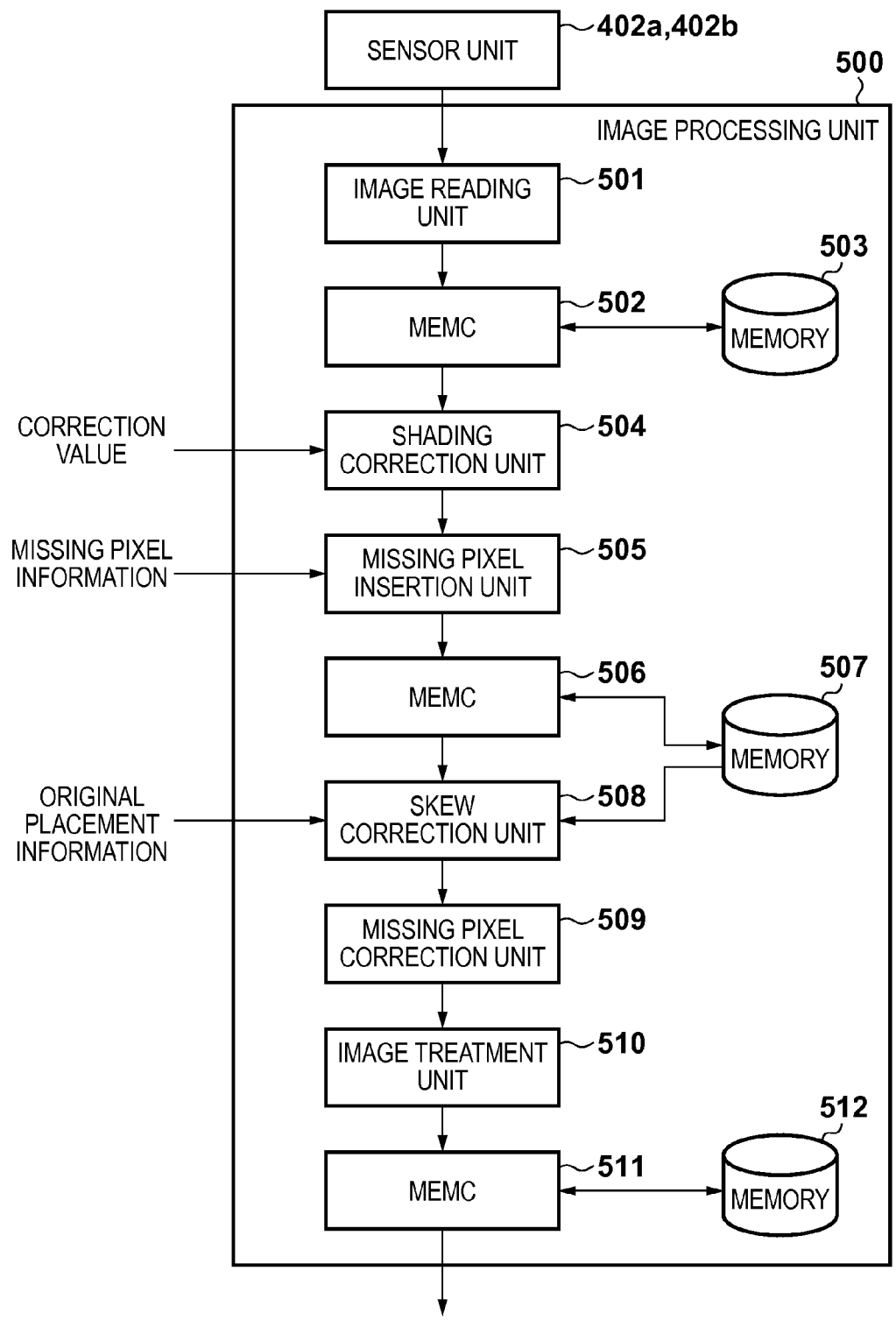
FIG. 8 is a block diagram for explaining the arrangement of an image processing unit in a reading apparatus according to the third embodiment.

The arrangement of an image processing unit 500 in the reading apparatus according to the third embodiment will be described with reference to a block diagram shown in FIG. 8. An image reading unit 501 reads an original image using a plurality of sensor units. As described above, an image on a tilted original may be read. For the sake of simplicity, assume that the image reading unit 501 includes two sensor units 402*a* and 402*b*, and there is a gap between the sensor units.

Figure 9A:
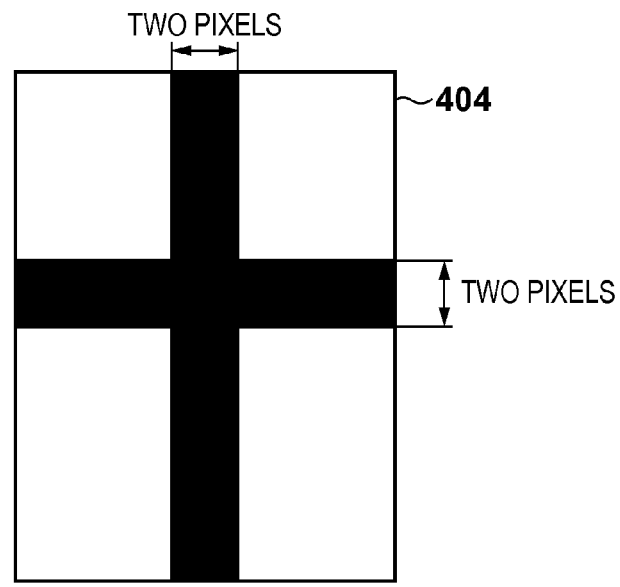
FIGS. 9A and 9B are views for explaining reading of an image by an image reading unit.
Figure 9B:
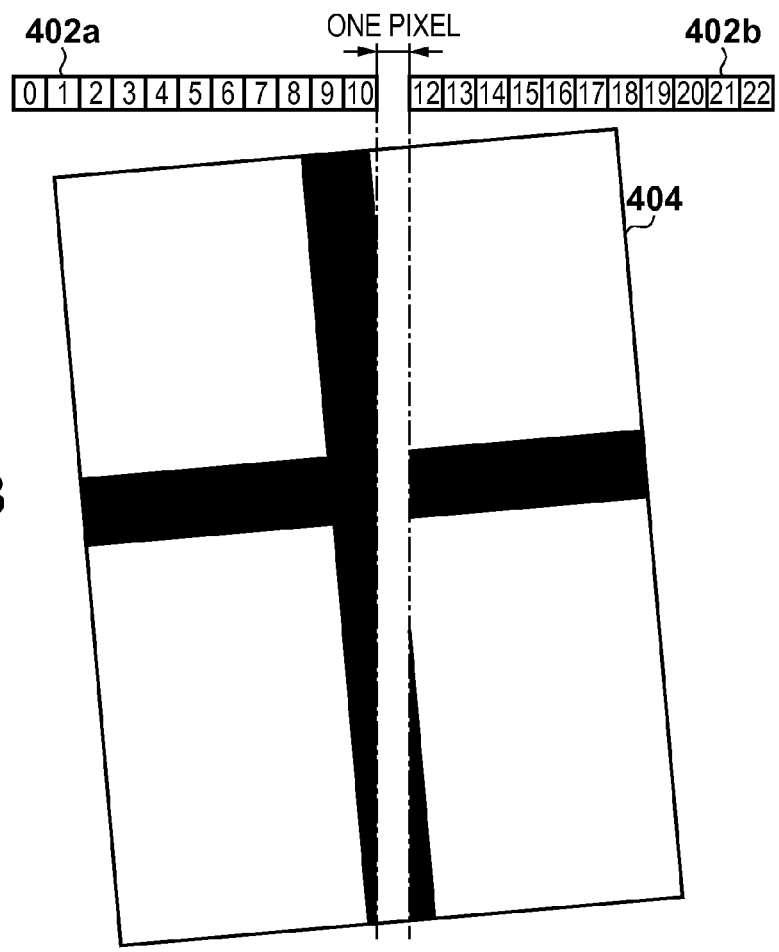

Reading of an image by the image reading unit 501 will be explained with reference to FIGS. 9A and 9B. FIG. 9A shows an example of an image on an original 404 on which two black lines orthogonal to each other and having a width of two pixels are drawn on a white ground. As shown in FIG. 9B, the image reading unit 501 reads the image from the tilted original 404. Furthermore, as shown in FIG. 9B, assume that each of the sensor units 402*a* and 402*b* generates image data of 11 pixels per line, there is a gap of one pixel between the sensor units 402*a* and 402*b*, and one missing pixel occurs on each line of the image.

A memory controller (MEMC) 502 writes image data output from the image reading unit 501 in a memory 503. When a write amount reaches a predetermined amount, the MEMC 502 reads out pixel values in the sub-scanning direction Y from the memory 503. The reason why the MEMC 502 reads out the pixel values in the sub-scanning direction Y is to reduce the memory amount of a shading correction unit 504 (to be described later).

Pixel Command

Figure 10A:
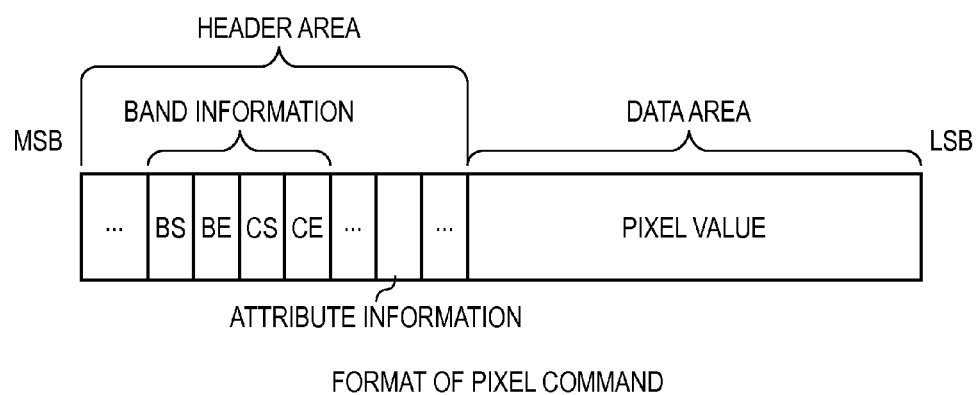
FIGS. 10A and 10B are views each for explaining a data format when a memory controller transfers a pixel value read out from a memory.
Figure 10B:
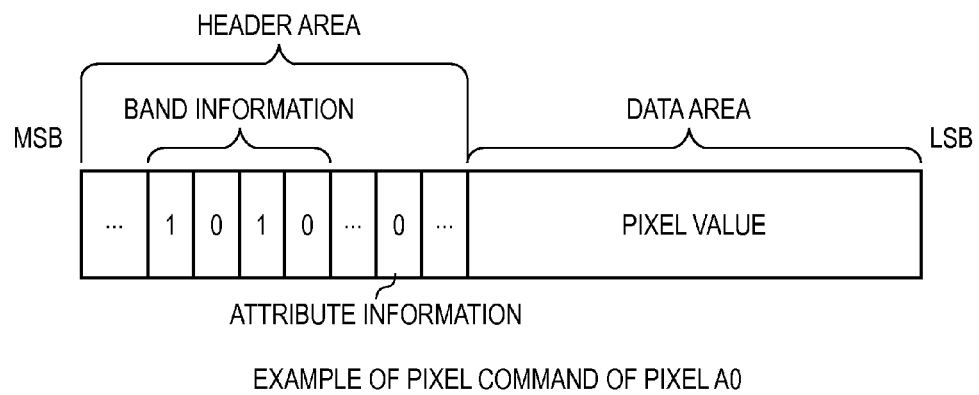

A data format when the MEMC 502 transfers the pixel value read out from the memory 503 with reference to FIGS. 10A and 10B. As shown in FIG. 10A, the pixel value is transferred as a pixel command added with a header area. The header area includes band information indicating the end position of a pixel in each band. The band information includes at least a band start (BS) bit, band end (BE) bit, column start (CS) bit, and column end (CE) bit. For BS, BE, CS, and CE, "1" indicates "applicable" and "0" indicates "not applicable".

Although the header area has not been added yet when the MEMC 502 reads out the pixel value from the memory 503, the header area can include 1-bit attribute information indicating whether the pixel is a missing pixel or not. For the attribute information, "1" indicates a missing pixel, and "0" indicates non-missing pixel.

For example, in the pixel command of a pixel A0 shown in FIG. 10B, BS and CS indicate "1", BE and CE indicate "0", and the attribute information indicates "0". That is, the pixel command indicates that the pixel A0 is positioned at the start point of a band and a column in a transfer operation for each band, and is not a missing pixel.

Note that the header area stores, for example, information for identifying the format of the pixel command in addition to the above-described information. This is not directly related to this embodiment and a description thereof will be omitted. Transferring a pixel value as such pixel command enables an image processing unit of the succeeding stage to readily calculate a pixel position.

Processing Unit

Reading of pixel values for each band will be described with reference to FIG. 11. A circle drawn by a solid line represents a pixel (to be referred to as an "effective pixel" hereinafter) read by the image reading unit 501. For the sake of simplicity, column numbers are given in the main scanning direction X, and line numbers are given in the sub-scanning direction Y. For example, the pixel A0 corresponds to a pixel at a position having a line number A and a column number 0. Pixels at positions having column numbers 0 to 10 and column numbers 12 to 22 are effective pixels.

When the image reading unit 501 reads an image, there is no column corresponding to a column number 11. For the sake of easy understanding, FIG. 11 shows a column corresponding to the column number 11. A circle drawn by a broken line on a column having the column number 11 corresponds to a missing pixel. Although FIG. 11 virtually shows the two lines of the original 404 shown in FIG. 9A, the two lines do not actually exist.

Arrows shown in FIG. 11 represent the reading order (output order) of the pixel values. Referring to FIG. 11, a pixel represented by a hatched circle corresponds to a column start (CS) or column end (CE pixel, and a pixel represented by a crosshatched circle corresponds to a band start (BS) or band end (BE) pixel. Pixels from the BS pixel to the BE pixel are a unit of band processing, and pixels from the CS pixel to the CE pixel is a unit of column processing within a band.

Shading Correction

The shading correction unit 504 performs shading correction of the pixel value included in the pixel command read out by the MEMC 502 from the memory 503 to correct variations in luminance in the main scanning direction X and the like. A correction value for shading correction is different for each light-receiving element of the sensor units 402*a* and 402*b*. In other words, the correction value for shading correction is different for each column and exists for each column.

Figure 12:
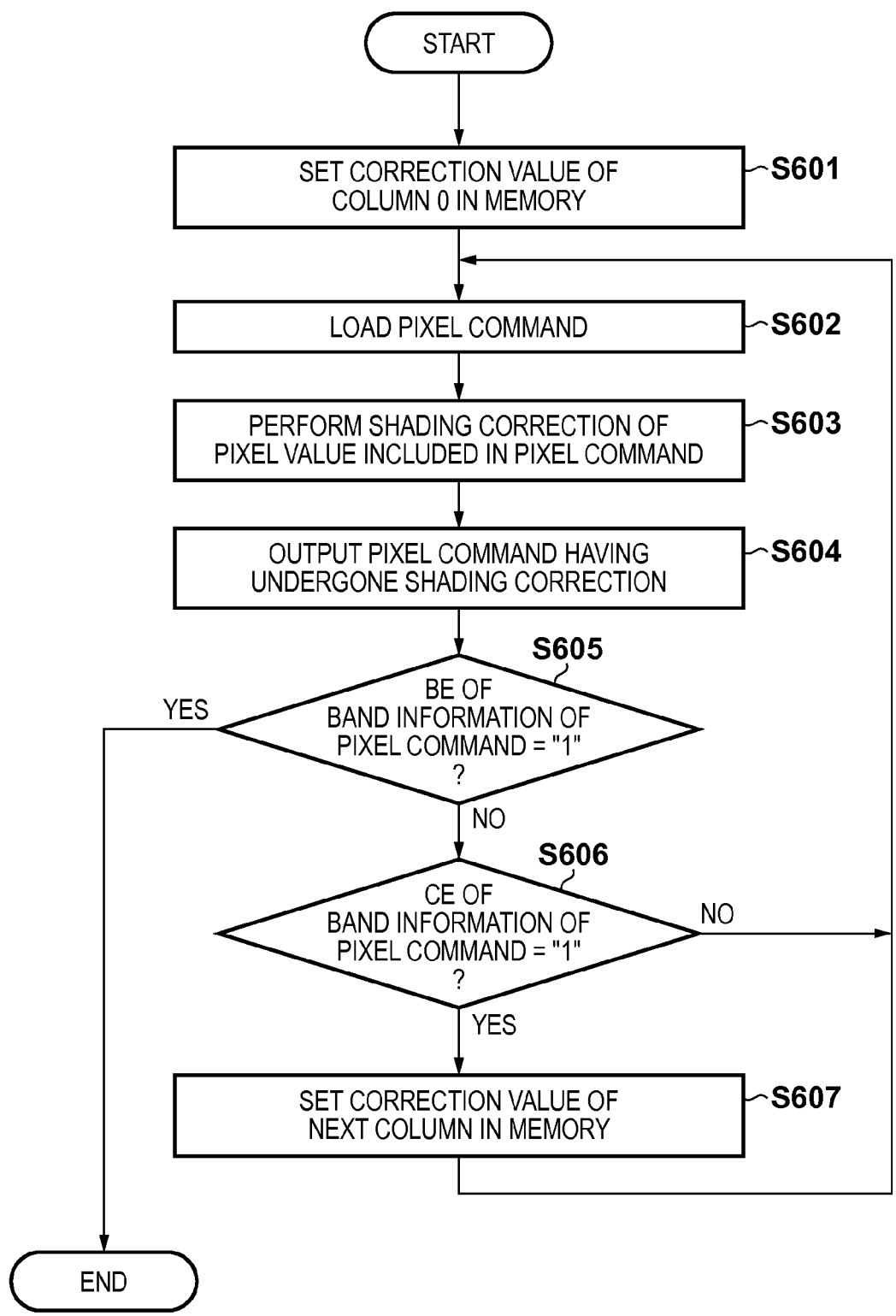
FIG. 12 is a flowchart for explaining the processing of a shading correction unit.

The processing of the shading correction unit 504 will be described with reference to a flowchart shown in FIG. 12. Note that FIG. 12 shows shading correction processing executed for each band. Upon start of reading of an image, the shading correction unit 504 sets the correction value of the column 0 in the memory (S601). The shading correction unit 504 loads a pixel command (S602), performs shading correction of a pixel value included in the pixel command using the correction value set in the memory (S603), and outputs the pixel command having undergone shading correction (S604).

The shading correction unit 504 determines BE of the band information of the pixel command (S605). If BE="1", the shading correction unit 504 terminates the band processing. Alternatively, if BE="0", the shading correction unit 504 determines CE of the band information (S606). If CE="1", the shading correction unit 504 recognizes the pixel as the last pixel of the processing for each column. The shading correction unit 504 sets the correction value of the next column in the memory to replace the correction value by the correction value of the next column (S607), and returns the process to step S602 to process the next pixel command. On the other hand, if CE="0", the shading correction unit 504 recognizes the pixel as a pixel in the middle of the processing for each column, and returns the process to step S602 to process the next pixel command.

As described above, since the pixel values read out by the MEMC 502 in the sub-scanning direction Y are input, the shading correction unit 504 does not require a memory amount for setting the correction values of all the light-receiving elements of the sensor units 402a and 402b. In other words, it is only necessary to provide, in the shading correction unit 504, a memory having a memory capacity capable of setting a correction value for at least one column (one light-receiving element), and to replace the correction value for each unit of column processing.

Insertion of Missing Pixel

A missing pixel insertion unit 505 receives the pixel commands having undergone shading correction, and inserts the pixel command of a missing pixel to a position corresponding to the gap between the sensor units 402a and 402b in the image data formed by a set of pixel commands based on missing pixel information (to be described later). The missing pixel insertion unit 505 generates attribute information based on the missing pixel information, and adds the attribute information to the header area of the inserted pixel command.

The missing pixel insertion unit 505 only inserts the missing pixel without correcting the pixel value of the missing pixel. A missing pixel correction unit 509 (to be described alter) corrects the pixel value of the missing pixel. That is, the processing (to be referred to as "missing pixel correction" hereinafter) of inserting the missing pixel and correcting the pixel value of the missing pixel is divided into processing executed by the missing pixel insertion unit 505 and processing executed by missing pixel correction unit 509. Dividing missing pixel correction makes it possible to perform missing pixel correction of image data having undergone tilt correction.

Tilt Correction (Skew Correction)

An MEMC 506 having the same arrangement as that of the MEMC 502 writes the pixel commands output from the missing pixel insertion unit 505 in a memory 507 shared with a skew correction unit 508. When the write amount reaches a predetermined amount, the MEMC 506 reads out the pixel commands from the memory 507 in the writing order.

The skew correction unit 508 receives the pixel command read out by the MEMC 506 from the memory 507, and calculates an address in the memory 507 based on the band information of the header area of the pixel command and the tilt angle θ of the original acquired from the above-described original placement information. The skew correction unit 508 reads out a pixel command corresponding to a position rotated by an angle of −θ by reading out the pixel command stored in the memory 507 according to the calculated address.

The skew correction unit 508 interpolates the pixel value and the attribute information of the pixel command read out from the memory 507 by referring to the pixel values and the pieces of attribute information of the neighboring pixel commands, thereby generating an image (to be referred to as a "tilt corrected image" hereinafter) having undergone tilt correction. Note that it is only necessary to use a method such as a nearest neighbor mechanism or bilinear interpolation to perform interpolation.

FIG. 13 shows an example of the tilt corrected image. Similarly to FIG. 11, a circle drawn by a broken line shown in FIG. 13 corresponds to a missing pixel having attribute information "1". Similarly to FIG. 11, FIG. 13 virtually shows the two lines of the original 404, but the two lines do not actually exist. Note that even if tilt correction is performed, it may be impossible to obtain satisfactory lines shown in FIG. 13. In this case, the image quality is improved by performing filter processing such as edge enhancement processing or thickening processing for the tilt corrected image.

As indicated by arrows in FIG. 13, the skew correction unit 508 outputs the pixel commands of the tilt corrected image in the sub-scanning direction Y. At this time, the skew correction unit 508 resets the band information of the pixel command to be output in accordance with the transfer order shown in FIG. 13. In the pixel command of the tilt corrected image to be output, not only the pixel value but also the added attribute information has also undergone tilt correction. The missing pixel correction unit 509 of the succeeding stage, therefore, can determine whether the pixel of interest is a missing pixel by referring to the attribute information of the tilt corrected image.

Correction of Missing Pixel

The missing pixel correction unit 509 receives the pixel commands of the tilt corrected image, determines a missing pixel by referring to the attribute information, and corrects the pixel value of the missing pixel. For example, the missing pixel correction unit 509 need only calculate, as the value of the missing pixel, the average of the values of non-missing pixels (to be referred to as "right and left effective pixels" hereinafter) adjacent to the missing pixel in the main scanning direction. Alternatively, the missing pixel correction unit 509 may calculate, as the value of the missing pixel, the weighted average of the values of two right effective pixels and two left effective pixels, or the average or weighted average of the values of the right and left effective pixels, the value of an effective pixel obliquely above the missing pixel, and the value of an effective pixel obliquely below the missing pixel.

The missing pixel correction unit 509 sets the calculated value as the pixel value of the pixel command of the missing pixel, thereby completing missing pixel correction. Note that upon completion of missing pixel correction, a significant value is set as the pixel value of the pixel command of the missing pixel. However, the pixel value of the pixel command of the missing pixel before the completion of missing pixel correction is arbitrary.

An image treatment unit 510 receives the image data having undergone missing pixel correction from the missing pixel correction unit 509, and performs necessary image processing of the image data. The image processing executed by the image treatment unit 510 includes, for example, color conversion processing, magnification processing, and filter processing.

An MEMC 511 having the same arrangement as that of the MEMC 502 writes the image data output from the image treatment unit 510 in a memory 512, and outputs the image data stored in the memory 512 according to a request of a processing unit connected to the succeeding stage of the image processing unit 500. Examples of the processing unit of the succeeding stage of the image processing unit 500 are a printing unit for executing print processing, and a communication unit for transmitting the image data to a client apparatus.

[Missing Pixel Insertion Unit]

Figure 14:
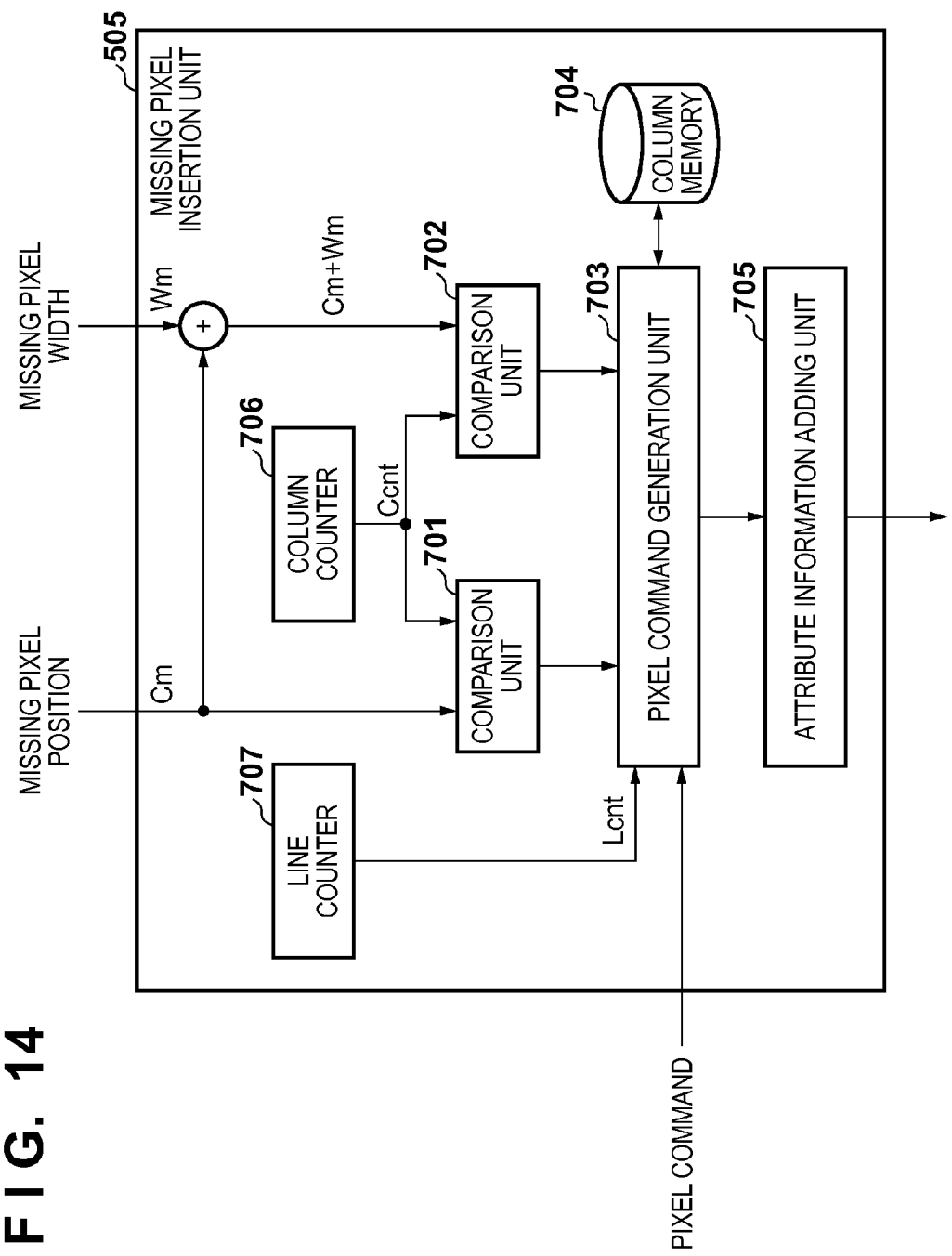
FIG. 14 is a block diagram for explaining the arrangement of a missing pixel insertion unit.
Figure 15:
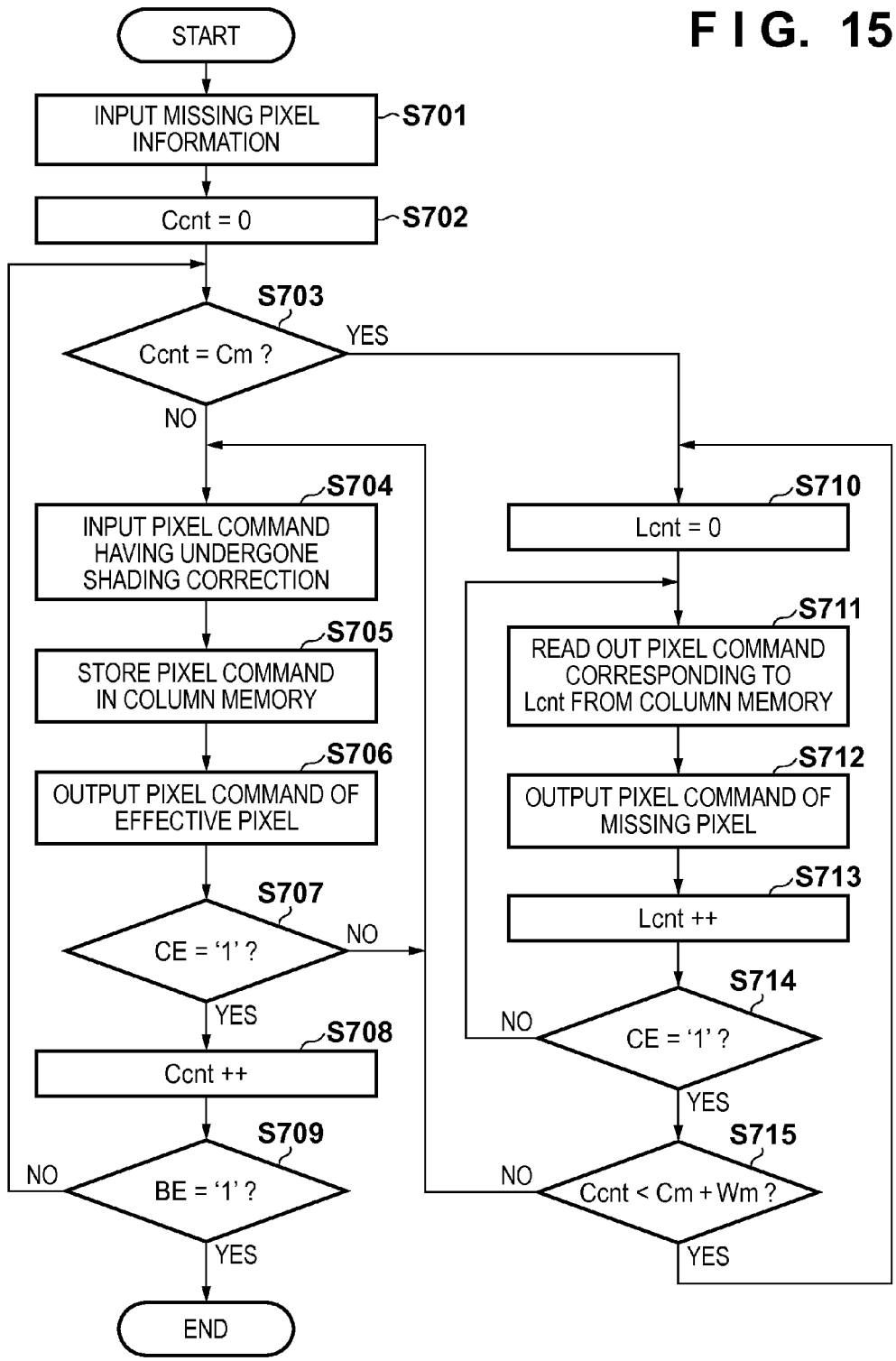
FIG. 15 is a flowchart for explaining the operation of the missing pixel insertion unit.

The arrangement and operation of the missing pixel insertion unit 505 will be described with reference to a block diagram shown in FIG. 14 and a flowchart shown in FIG. 15. Note that FIG. 15 shows processing for one band. Furthermore, FIGS. 16A and 16B each show an example of a pixel command.

The missing pixel insertion unit 505 inputs missing pixel information acquired in advance (S701). The missing pixel information indicates a missing pixel position corresponding to the position of the gap between the plurality of sensor units, and a missing pixel width corresponding to the width of the gap. For example, the missing pixel information can be acquired from the above-described attachment position information indicating the specification at the time of attaching the sensor units 402a and 402b, or acquired by performing a pre-scan. In the example shown in FIG. 9B, the missing pixel information indicates a missing pixel position "11" and a missing pixel width "1".

The missing pixel insertion unit 505 initializes the count value of a column counter 706 to 0 (S702). The column counter 706 is the internal counter of the missing pixel insertion unit 505, and is used to detect a column position.

The missing pixel insertion unit 505 causes a comparison unit 701 to compare a count value Ccnt of the column counter 706 with a missing pixel position Cm indicated by the missing pixel information (S703). If Ccnt≠Cm, it is possible to determine the column position of an effective pixel; otherwise, it is possible to determine the column position of a missing pixel. That is, if Ccnt≠Cm, the missing pixel insertion unit 505 causes a pixel command generation unit 703 and an attribute information adding unit 705 to generate the pixel command of the effective pixel (S704 to S709). On the other hand, if Ccnt=Cm, the missing pixel insertion unit 505 causes the pixel command generation unit 703 and the attribute information adding unit 705 to generate the pixel command of the missing pixel (S710 to S715).

Generation of the pixel command of the effective pixel will be explained first. The pixel command generation unit 703 inputs a pixel command having undergone shading correction (S704), and stores the received pixel command in a column memory 704 (S705). The column memory 704 is the internal memory of the missing pixel insertion unit 505, and can store pixel commands for at least one column. Note that the pixel command stored in the column memory 704 is used to generate the pixel command of the missing pixel (to be described later).

Figure 16A:
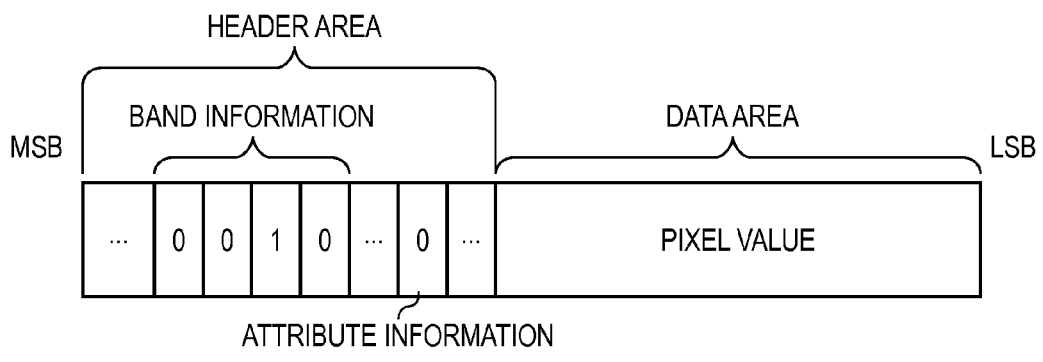
FIGS. 16A and 16B are views each showing an example of a pixel command.

The attribute information adding unit 705 outputs the pixel command of the effective pixel obtained by adding attribute information "0" to the pixel command received from the pixel command generation unit 703 (S706). For example, a pixel command including attribute information "0" shown in FIG. 16A is output for a pixel A10 shown in FIG. 11.

The missing pixel insertion unit 505 determines CE of the band information of the pixel command (S707). If CE="1", the missing pixel insertion unit 505 increments the count value of the column counter 706 (S708). The missing pixel insertion unit 505 determines BE of the band information of the pixel command (S709). If BE="1", the missing pixel insertion unit 505 terminates the processing for each band. On the other hand, if BE="0", the missing pixel insertion unit 505 determines that the processing for each band is incomplete, and returns the process to step S703.

Generation of the pixel command of the missing pixel will be described next. The missing pixel insertion unit 505 initializes a count value Lcnt of a line counter 707 to 0 (S710). The line counter 707 is the internal counter of the missing pixel insertion unit 505, and is used to generate an address in the column memory 704 by counting lines.

The pixel command generation unit 703 reads out a pixel command from the address in the column memory 704 corresponding to the count value Lcnt of the line counter 707 (S711). The attribute information adding unit 705 outputs the pixel command of the missing pixel obtained by adding attribute information "1" to the pixel command received from the pixel command generation unit 703 (S712).

Figure 16B:
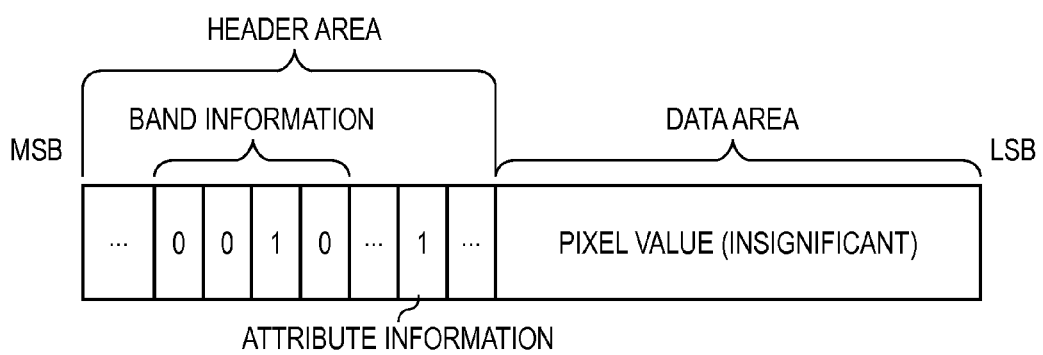

That is, the pixel command on a column formed from effective pixels immediately before the gap is read out from the column memory 704, and the attribute information of the pixel command is changed to "1". For example, a pixel command shown in FIG. 16B is obtained by copying the pixel command of the pixel A10 shown in FIG. 16A as the pixel command of a pixel A11 shown in FIG. 11, and changing the attribute information of the pixel command to "1".

Note that the pixel command of the missing pixel output from the missing pixel insertion unit 505 is added with the pixel value of the pixel command on the column formed from effective pixels immediately before the gap, but the pixel value is not significant. Therefore, when outputting the pixel command of the missing pixel, the pixel command generation unit 703 or the attribute information adding unit 705 may rewrite the pixel value to 0 or FF in the case of 8 bits or a predetermined value.

The missing pixel insertion unit 505 increments the count value Lcnt of the line counter 707 (S713), and determines CE of the band information of the generated pixel command (S714). If CE="0", the missing pixel insertion unit 505 returns the process to step S711 to generate the pixel command of the missing pixel on the next line. On the other hand, if CE="1", the missing pixel insertion unit 505 causes a comparison unit 702 to compare the count value Ccnt of the column counter 706 with the sum (Cm+Wm) of the missing pixel position Cm and the missing pixel width Wm of the missing pixel information (S715).

If Ccnt<(Cm+Wm), it is possible to determine that the next column is also a column of missing pixels. On the other hand, if Ccnt=(Cm+Wm), it is possible to determine that the next column is a column of effective pixels. That is, if Ccnt<(Cm+Wm), the missing pixel insertion unit 505 returns the process to step S710 to generate the pixel commands of the missing pixels on the next column. On the other hand, if Ccnt=(Cm+Wm), the missing pixel insertion unit 505 returns the process to step S704 to generate the pixel commands of the effective pixels on the next column.

A method has been explained above in which the MEMC 506 writes an image before tilt correction in the memory 507, and then the skew correction unit 508 reads out, from the memory 507, an image rotated by an angle of −θ to correct the tilt angle θ of the original. As an alternative method, the skew correction unit 508 may write a tilt corrected image in the memory 507, and the MEMC 506 may read out the tilt corrected image from the memory 507. In this case, however, the skew correction unit 508 performs a write operation by randomly accessing the memory 507, thereby making it difficult to control the timing at which the MEMC 506 reads out the tilt corrected image from the memory 507.

As described above, it is possible to reduce the memory capacity of a memory for shading correction and improve the image quality by tilt correction in the image reading apparatus in which the plurality of sensor units are arrayed in a line in the main scanning direction X. This embodiment effectively works especially when a line extending in the sub-scanning direction is positioned near the gap between the sensor units, and read by the plurality of sensor units due to the tilt of the original.

Note that reduction of the memory capacity of the memory for shading correction is effective for the image reading apparatus in which sensor units adjacent to each other in the main scanning direction X are arranged to partially overlap each other and have different offsets in the sub-scanning direction Y, as described in the first and second embodiments.

Fourth Embodiment

An image processing apparatus, a method therefor, and an image reading apparatus according to the fourth embodiment of the present invention will be described below. Note that in the fourth embodiment, the same reference numerals as those in the first to third embodiments denote the same components and a detailed description thereof will be omitted.

The third embodiment assumes that it is possible to assign 1-bit attribute information to a header area like the format of the pixel command shown in FIG. 10A. However, for example, if it is desired to reduce a pixel command transfer bandwidth or if resources such as hardware and software developed in the past are used, it may be impossible to assign attribute information to a header area. An arrangement in consideration of this point will be explained in the fourth embodiment.

Figure 17A:
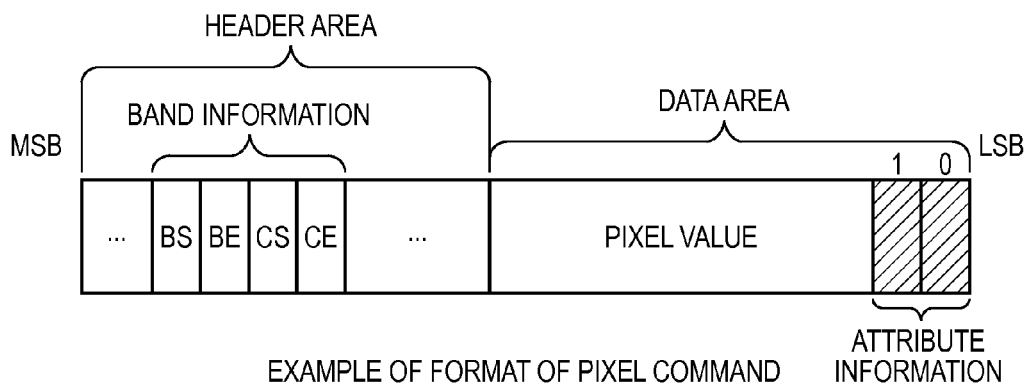
FIGS. 17A to 17C are views each for explaining a format when a memory controller transfers a pixel command according to the fourth embodiment.
Figure 17B:
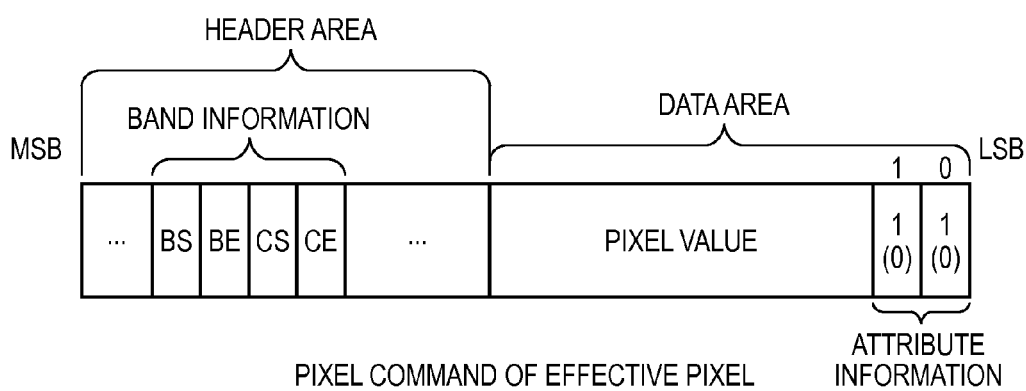
Figure 17C:
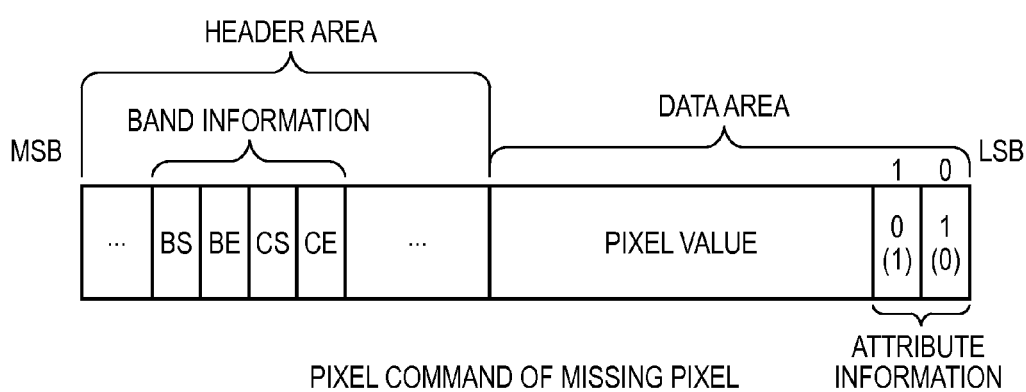

A format when an MEMC 502 transfers a pixel command according to the fourth embodiment will be described with reference to FIGS. 17A to 17C. Unlike the format shown in FIG. 10A, no attribute information is assigned to the header area of the format of the pixel command according to the fourth embodiment shown in FIG. 17A. Attribute information is presented using lower bits of a data area, which will be described later.

A missing pixel insertion unit 505 inserts a missing pixel by the same method as that in the third embodiment. Note that since no attribute information is assigned to the header area, the 0th bit of a pixel value is set to the same value as that of the first bit for an effective pixel. FIG. 17B shows the pixel command of an effective pixel. If the first bit of the pixel value is "1", the 0th bit is set to "1". If the first bit is "0", the 0th bit is set to "0".

For a missing pixel, the missing pixel insertion unit 505 sets the 0th bit of a pixel value to a value different from that of the first bit. FIG. 17C shows the pixel command of the missing pixel. If the first bit of the pixel value is "1", the 0th bit is set to "0". If the first bit is "0", the 0th bit is set to "1".

That is, lower two bits of a pixel value are used as attribute information for determining whether a corresponding pixel is an effective pixel or missing pixel. The reason why attribute information is represented by lower two bits is to minimize variations in pixel value. The lower two bits of the pixel value of the effective pixel before and after attribute information is added are as follows:

| before addition | | after addition |
|---|---|---|
| "00" | → | "00" |
| "01" | → | "00" |
| "10" | → | "11" |
| "11" | → | "11" |

When the pixel value of the effective pixel before a bit operation is "01" or "10", the pixel value varies. In either case, the pixel value varies at a minimum level of one. Thus, there is almost no visual influence. Note that the pixel value of the missing pixel before correction is not a significant value, as described above, except that lower two bits indicate a missing pixel. Even if, therefore, the pixel value varies, there is no influence. Furthermore, if lower one bit of the pixel value is "0", an effective pixel may be indicated, and if the bit is "1", a missing pixel may be indicated. Alternatively, "0" may indicate a missing pixel, and "1" may indicate an effective pixel. That is, it is only necessary to indicate an effective pixel or missing pixel by operating the lower bit of the pixel value.

A skew correction unit 508 performs the same tilt correction processing as that in the third embodiment. In interpolation of a pixel value at this time, the lower bits of the pixel value are maintained to maintain attribute information. That is, if the lower bits before correction of a pixel of interest indicate an effective pixel, the value of the 0th bit is changed, as needed, so that the lower bits after correction also indicate an effective pixel. Similarly, if the lower bits before correction indicate a missing pixel, the value of the 0th bit is changed, as needed, so that the lower bits after correction also indicate a missing pixel.

A missing pixel correction unit 509 determines a missing pixel by referring to the lower bits of each pixel command of a tilt corrected image output from the skew correction unit 508, and corrects the pixel value of the missing pixel, similarly to the third embodiment.

As described above, by representing attribute information using the lower bits of the pixel value of a pixel command, it is possible to correct a missing pixel even if it is impossible to assign attribute information to the header area of the pixel command.

In the third and fourth embodiments, for the sake of simplicity, an example of an image reading apparatus using two sensor units has been explained. However, the image processing apparatus according to the third or fourth embodiment is applicable as an image reading apparatus using four sensor units, as described in the first and second embodiments, or an image reading apparatus using more than four sensor units. That is, in each of the aforementioned embodiments, the number of sensor units is not limited as long as an image reading apparatus uses two or more sensor units.

Other Embodiment

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2013-185705 filed Sep. 6, 2013 and No. 2014-118135 filed Jun. 6, 2014 which are hereby incorporated by reference herein in their entirety.

What is claimed is:

1. An image processing apparatus for generating image data of an original based on images read by a plurality of sensor units arranged in a main scanning direction so that a reading area of each sensor unit partially overlaps with a reading area of an adjacent sensor unit, and each sensor unit reading an image of a partial region divided from a region of the original along a sub-scanning direction, the apparatus comprising:
   a storage unit configured to store attachment position information indicating an attachment, position of each sensor unit; and
   a geometric correction unit configured to perform tilt correction based on placement information of the original and attachment error correction based on the attachment position information for image data output from the plurality of sensor units, and perform joint processing for the corrected image data so as to generate image data of the original,
   wherein (a) the tilt correction is processing of correcting a tilt of the original in the image data, (b) the tilt of the original is detected for each original read, (c) the attachment error correction is processing of correcting an attachment error of each sensor unit in image data output from the sensor unit, and (d) as a part of the attachment error, each sensor unit has a different tilt.

2. The apparatus according to claim 1, wherein the geometric correction unit transforms first coordinate values of a processing target pixel with reference to the original into second coordinate values with reference to a reading unit to which the plurality of sensor units are attached in accordance with coordinate transformation using, as parameters, a shift position and tilt angle of the original indicated by the placement information, and determine, based on the second coordinate values, a sensor unit capable of reading the processing target pixel among the plurality of sensor units so as to perform the joint processing.

3. The apparatus according to claim 2, wherein the geometric correction unit transforms the first coordinate values into third coordinate values with reference to the sensor unit capable of reading the processing target pixel in accordance with coordinate transformation using, as parameters, an attachment angle and attachment position indicated by the attachment position information of the sensor unit and a shift position and tilt angle of the original indicated by the placement information, and acquires, as a pixel value of the processing target pixel, a pixel value which is output from the sensor unit and corresponds to the third coordinate values.

4. The apparatus according to claim 3, wherein, in a case where there are a plurality of sensor units capable of reading the processing target pixel, the geometric correction unit acquires the pixel value of the processing target pixel by performing weighting processing of pixel values which are output from those sensor units and correspond to the third coordinate values.

5. The apparatus according to claim 2, wherein, in a case where there is no sensor unit capable of reading the processing target pixel, the geometric correction unit sets a pixel value corresponding to a predetermined background color as a pixel value of the processing target pixel.

6. The apparatus according to claim 1, further comprising an image treatment unit configured to perform image processing for image data having undergone the attachment error correction, the tilt correction, and the joint processing, wherein the geometric correction unit determines the processing target pixel according a request of the image treatment unit.

7. The apparatus according to claim 1, further comprising; a detection unit configured to detect a location where an original to be read is disposed; a transformation unit configured to transform coordinate values of a processing target pixel in the image data of the original into coordinate vales in a reference coordinate system based on the location of the original; a determination unit configured to hold information indicating a readable range of each sensor unit, and determine whether the processing target pixel is in the readable range of which a sensor unit; wherein the geometric correction unit acquires a pixel value corresponding to the transformed coordinate values in the partial image read by the sensor unit determined by the determination unit, and calculates a pixel value of the processing target pixel after the tilt correction and the attachment error correction, based on the acquired pixel value.

8. The apparatus according to claim 1, further comprising a detection unit configured to detect a tilt angle of an original with respect to the main scanning direction in a reference coordinate system, wherein the storage unit holds, as the attachment position information, an attachment angle of each sensor unit with respect to the main scanning direction, and the geometric correction unit generates the image data of the original using an expression indicating a correspondence between a coordinate system of the original and a coordinate system of each sensor unit.

9. An image reading apparatus comprising:
   a reading unit to which a plurality of sensor units are attached, wherein the plurality of sensor units arranged in a main scanning direction so that a reading area of each sensor unit partially overlaps with a reading area of an adjacent sensor unit, and each sensor unit reads an image of a partial region divided from a region of an original along a sub-scanning direction; and
   an image processing unit configured to generate image data of the original based on images read by the plurality of sensor units,
   wherein the image processing unit comprises:
   a storage unit configured to store attachment position information indicating an attachment position of each sensor unit; and
   a geometric correction unit configured to perform tilt correction based on placement information of the original and attachment error correction based on the attachment position information for image data output from the plurality of sensor units, and perform joint processing for the corrected image data so as to generate image data of the original,
   wherein (a) the tilt correction is processing of correcting a tilt of the original in the image data, (b) the tilt of the original is detected for each original read, (c) the attachment error correction is processing of correcting an attachment error of each sensor unit in image data output from the sensor unit, and (d) as a part of the attachment error, each sensor unit has a different tilt.

10. A method of an image processing apparatus for generating image data of an original based on images read by a plurality of sensor units arranged in a maim scanning direction so that a reading area of each sensor unit partially overlaps with a reading area of an adjacent sensor unit, each sensor unit reading an image of a partial region divided from a region of the original along a sub-scanning direction, and the apparatus comprising a storage unit configured to store attachment position information indicating an attachment, position of each sensor unit, the method comprising:

using a processor to perform:

performing tilt correction based on placement information of the original and attachment error correction based on the attachment position information for image data output from the plurality of sensor units; and performing joint processing for the corrected image data so as to generate image data of the original, wherein (a) the tilt correction is processing of correcting a tilt of the original in the image data, (b) the tilt of the original is detected for each original read, (c) the attachment error correction is processing of correcting an attachment error of each sensor unit in image data output from the sensor unit, and (d) as a part of the attachment error, each sensor unit has a different tilt different.

11. A non-transitory computer readable medium storing a computer-executable program for causing a computer to perform a method of an image processing apparatus for generating image data of an original based on images read by a plurality of sensor units arranged in a main scanning direction so that a reading area of each sensor unit partially overlaps with a reading area of an adjacent sensor unit, each sensor unit reading an image of a partial region divided from a region of the original along a sub-scanning direction, and the apparatus comprising a storage unit configured to store attachment position information indicating an attachment position of each sensor unit, the method comprising:

performing tilt correction based on placement information of the original and attachment error correction based on the attachment position information for image data output from the plurality of sensor units; and performing joint processing for the corrected image data so as to generate image data of the original, wherein (a) the tilt correction is processing of correcting a tilt of the original in the image data, (b) the tilt of the original is detected for each original read, (c) the attachment error correction is processing of correcting an attachment error of each sensor unit in image data output from the sensor unit, and (d) as a part of the attachment error, each sensor unit has a different tilt.

* * * * *